(12) United States Patent
Ly et al.

(10) Patent No.: US 12,127,197 B2
(45) Date of Patent: Oct. 22, 2024

(54) ACKNOWLEDGEMENT TRANSMISSIONS ASSOCIATED WITH PHYSICAL DOWNLINK CONTROL CHANNEL DEMODULATION REFERENCE SIGNAL BUNDLING

(71) Applicant: QUALCOMM Incorporated, San Diego, CA (US)

(72) Inventors: Hung Dinh Ly, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/379,459

(22) Filed: Jul. 19, 2021

(65) Prior Publication Data

US 2023/0014728 A1    Jan. 19, 2023

(51) Int. Cl.
*H04W 72/04* (2023.01)
*H04L 1/18* (2023.01)
(Continued)

(52) U.S. Cl.
CPC .......... *H04W 72/20* (2023.01); *H04L 1/1812* (2013.01); *H04L 5/0048* (2013.01);
(Continued)

(58) Field of Classification Search
None
See application file for complete search history.

(56) References Cited

U.S. PATENT DOCUMENTS

2014/0105057 A1* 4/2014 Liu ................ H04L 43/12 370/252
2015/0117346 A1* 4/2015 Lin ................ H04W 72/21 370/329

(Continued)

FOREIGN PATENT DOCUMENTS

EP    3512141 A1    7/2019
WO    2020030254 A1    2/2020

OTHER PUBLICATIONS

International Search Report and Written Opinion—PCT/US2022/073105—ISA/EPO—Oct. 19, 2022.
(Continued)

*Primary Examiner* — Steve R Young
(74) *Attorney, Agent, or Firm* — ArentFox Schiff LLP

(57) ABSTRACT

Example aspects include a method, apparatus, and computer-readable medium for wireless communication at a user equipment (UE) of a wireless communication network, comprising receiving, from a base station, configuration information indicating that physical downlink control channel (PDCCH) joint channel estimation (JCE) is enabled for a plurality of PDCCH monitoring occasions. The aspects further include receiving, from the base station, a plurality of PDCCH transmissions. At least one PDCCH transmission comprises a hybrid automatic repeat request (HARD) acknowledgement (ACK) request without a corresponding physical downlink shared channel (PDSCH) grant. Additionally, the aspects further include identifying a base offset according to the at least one PDCCH transmission. Additionally, the aspects further include selecting an additional offset according to a processing time capability of the UE. Additionally, the aspects further include transmitting, at a timing offset in relation to the plurality of PDCCH transmissions, a HARQ-ACK.

30 Claims, 12 Drawing Sheets

(51) Int. Cl.
*H04L 1/1812* (2023.01)
*H04L 5/00* (2006.01)
*H04L 25/02* (2006.01)
*H04W 72/20* (2023.01)
*H04W 72/51* (2023.01)
*H04W 72/0446* (2023.01)

(52) U.S. Cl.
CPC ......... *H04L 25/0202* (2013.01); *H04W 72/51* (2023.01); *H04W 72/0446* (2013.01)

(56) References Cited

U.S. PATENT DOCUMENTS

| | | | | |
|---|---|---|---|---|
| 2015/0195822 | A1* | 7/2015 | Han | H04W 72/044 |
| | | | | 370/329 |
| 2015/0373694 | A1* | 12/2015 | You | H04L 5/0051 |
| | | | | 370/329 |
| 2019/0222380 | A1* | 7/2019 | Manolakos | H04L 25/0224 |
| 2019/0229780 | A1* | 7/2019 | Kim | H04B 7/0643 |
| 2020/0052804 | A1* | 2/2020 | Hao | H04B 17/309 |
| 2020/0314948 | A1* | 10/2020 | Babaei | H04L 1/1819 |
| 2021/0105761 | A1* | 4/2021 | Cheng | H04B 7/18504 |
| 2021/0136808 | A1* | 5/2021 | Yang | H04W 72/1273 |
| 2021/0320760 | A1* | 10/2021 | Rastegardoost | H04L 1/0028 |
| 2022/0183025 | A1* | 6/2022 | Fröberg Olsson | H04L 1/0042 |
| 2022/0217651 | A1* | 7/2022 | Papasakellariou | H04W 52/367 |
| 2022/0377780 | A1* | 11/2022 | Khoshkholgh Dashtaki | |
| | | | | H04W 72/21 |
| 2024/0048279 | A1* | 2/2024 | Wang | H04W 72/232 |

OTHER PUBLICATIONS

Moderator (Qualcomm): "Summary #1 of Email Discussions [104b-e-NR-feMIMO-02] for mTRP PDCCH Enhancements", 3GPP TSG-RAN WG1 Meeting #104-bis-e, R1-2103819, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 12, 2021, XP051995156, p. 27, 54 Pages.

Moderator (VIVO): "Discussion Summary #3 of [104-e-NR-52-71GHz-05]", 3GPP TSG RAN WG1 Meeting #104-e, R1-2102237, 3rd Generation Partnership Project, Mobile Competence Centre, 650, Route Des Lucioles, F-06921 Sophia-Antipolis Cedex, France, vol. RAN WG1, No. E-meeting, Jan. 25, 2021-Feb. 5, 2021, Feb. 8, 2021, XP051977799, pp. 1-110, p. 100.

VIVO: "Enhancements on Multi-TRP for PDCCH, PUCCH and PUSCH", 3GPP TSG RAN WG1 #104b-e, R1-2102507, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177212, 28 Pages, pp. 6, 7.

* cited by examiner

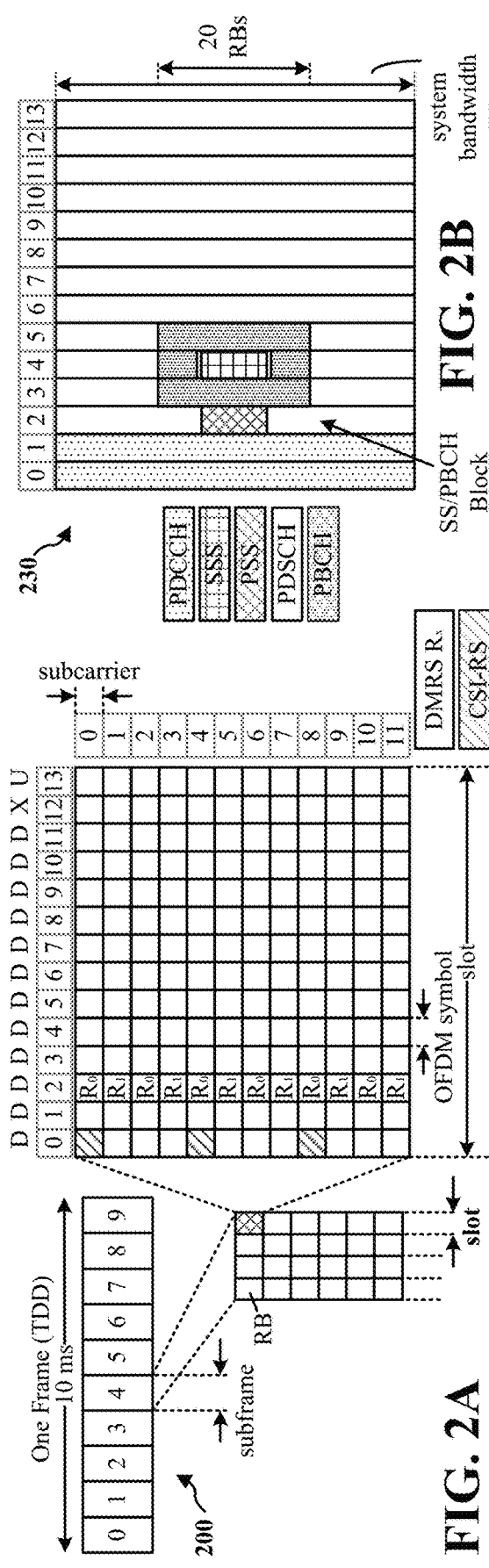
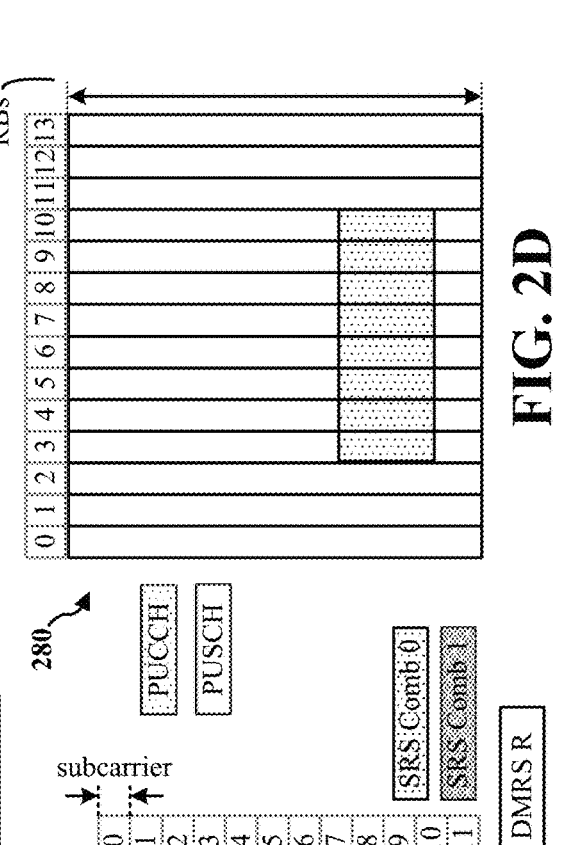
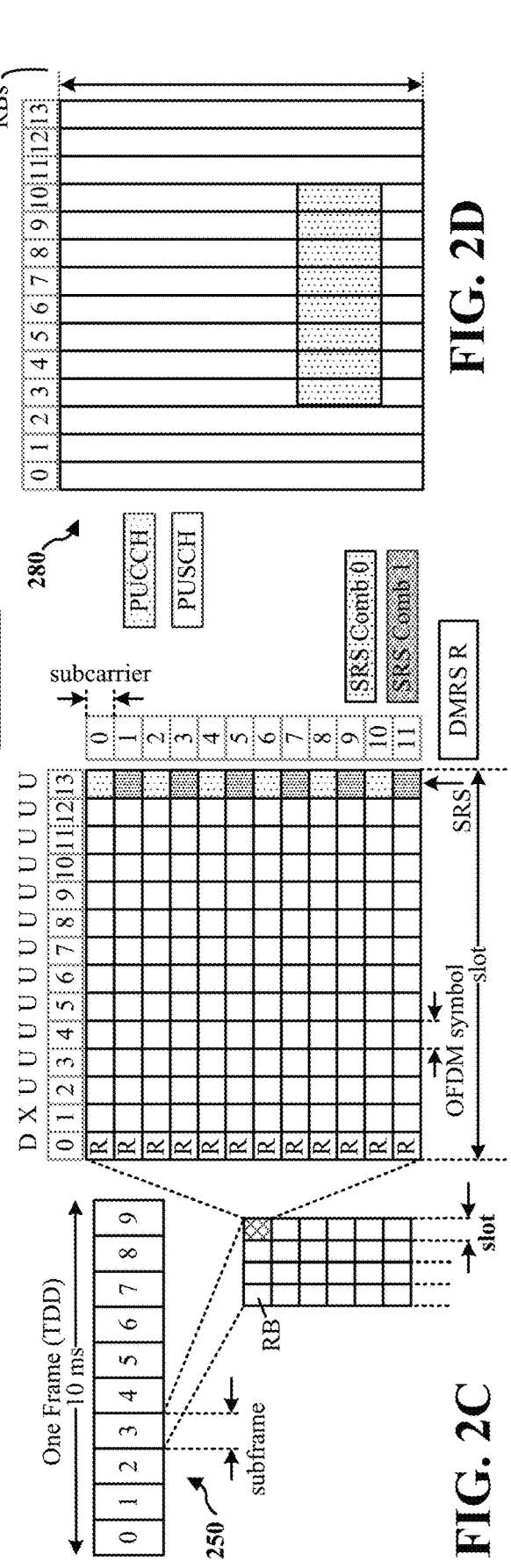
FIG. 2A  FIG. 2B  FIG. 2C  FIG. 2D

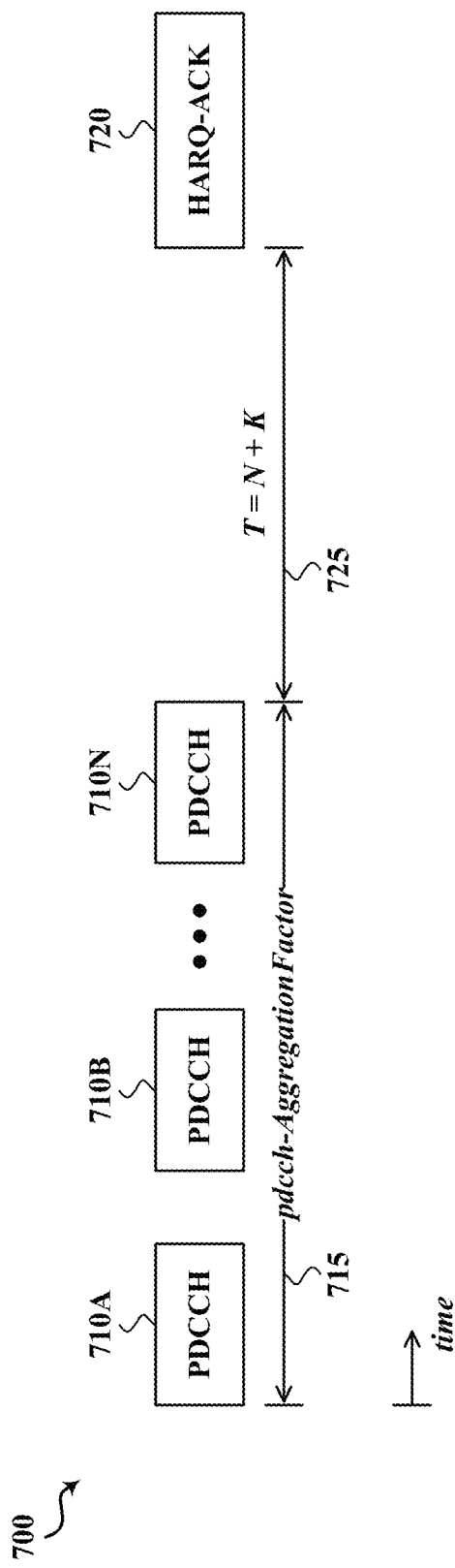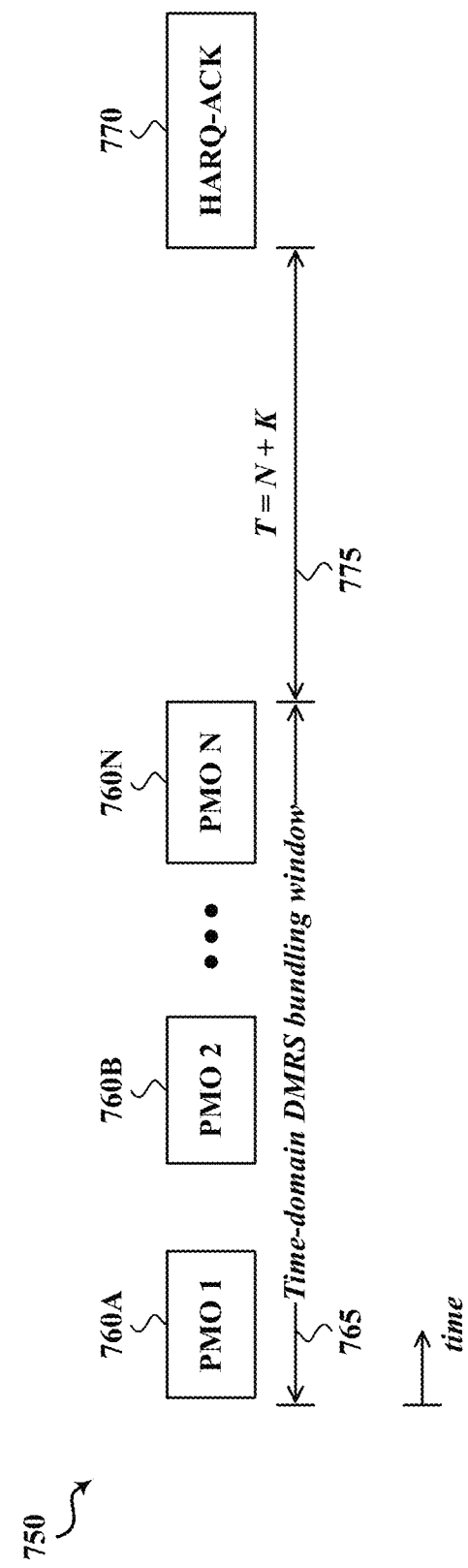

ACKNOWLEDGEMENT TRANSMISSIONS ASSOCIATED WITH PHYSICAL DOWNLINK CONTROL CHANNEL DEMODULATION REFERENCE SIGNAL BUNDLING

BACKGROUND

Technical Field

The described aspects relate generally to wireless communication systems, and more particularly, to apparatuses and methods for sending acknowledgement transmissions associated with physical downlink control channel (PDCCH) demodulation reference signal (DMRS) bundling.

Introduction

Wireless communication systems are widely deployed to provide various telecommunication services such as telephony, video, data, messaging, and broadcasts. Conventional wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, a wireless communication device in a wireless communication systems may utilize demodulation reference signals (DMRS) transmitted by another wireless communication device to perform channel estimation of wireless channels, such as a physical downlink control channel (PDCCH), between the devices. The channel estimation procedure requires processing resources, the use of which may jeopardize the performance of other procedures at the wireless communication device. Thus, improvements in wireless communication procedures are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

An example aspect includes a method of wireless communication by a user equipment (UE) of a wireless communication network, comprising receiving, from a base station, configuration information indicating that physical downlink control channel (PDCCH) joint channel estimation (JCE) is enabled for a plurality of PDCCH monitoring occasions. The method further includes receiving, from the base station, a plurality of PDCCH transmissions. The plurality of PDCCH transmissions being transmitted during the plurality of PDCCH monitoring occasions. At least one PDCCH transmission comprises a hybrid automatic repeat request (HARD) acknowledgement (ACK) request without a corresponding physical downlink shared channel (PDSCH) grant. Additionally, the method further includes identifying a base offset according to the at least one PDCCH transmission. Additionally, the method further includes selecting an additional offset according to a processing time capability of the UE. Additionally, the method further includes transmitting, at a timing offset in relation to the plurality of PDCCH transmissions, a HARQ-ACK. The timing offset comprises a sum of the base offset and the additional offset.

Another example aspect includes an apparatus for wireless communication by a UE of a wireless communication network, comprising a memory and a processor communicatively coupled with the memory. The processor is configured to receive, from a base station, configuration information indicating that PDCCH JCE is enabled for a plurality of PDCCH monitoring occasions. The processor is further configured to receive, from the base station, a plurality of PDCCH transmissions. The plurality of PDCCH transmissions being transmitted during the plurality of PDCCH monitoring occasions. At least one PDCCH transmission comprises a HARQ-ACK request without a corresponding PDSCH grant. Additionally, the processor is further configured to identify a base offset according to the at least one PDCCH transmission. Additionally, the processor is further configured to select an additional offset according to a processing time capability of the UE. Additionally, the processor is further configured to transmit, at a timing offset in relation to the plurality of PDCCH transmissions, a HARQ-ACK. The timing offset comprises a sum of the base offset and the additional offset.

Another example aspect includes an apparatus for wireless communication by a UE of a wireless communication network, comprising means for receiving, from a base station, configuration information indicating that PDCCH JCE is enabled for a plurality of PDCCH monitoring occasions. The apparatus further includes means for receiving, from the base station, a plurality of PDCCH transmissions. The plurality of PDCCH transmissions being transmitted during the plurality of PDCCH monitoring occasions. At least one PDCCH transmission comprises a HARQ-ACK request without a corresponding PDSCH grant. Additionally, the apparatus further includes means for identifying a base offset according to the at least one PDCCH transmission. Additionally, the apparatus further includes means for selecting an additional offset according to a processing time capability of the UE. Additionally, the apparatus further includes means for transmitting, at a timing offset in relation to the plurality of PDCCH transmissions, a HARQ-ACK. The timing offset comprises a sum of the base offset and the additional offset.

Another example aspect includes a computer-readable medium (e.g., non-transitory computer-readable medium) storing instructions for wireless communication by a UE of a wireless communication network, executable by a processor, to receive, from a base station, configuration information indicating that PDCCH JCE is enabled for a plurality of PDCCH monitoring occasions. The instructions are further executable to receive, from the base station, a plurality of PDCCH transmissions. The plurality of PDCCH transmissions being transmitted during the plurality of PDCCH monitoring occasions. At least one PDCCH transmission comprises a HARQ-ACK request without a corresponding PDSCH grant. Additionally, the instructions are further executable to identify a base offset according to the at least one PDCCH transmission. Additionally, the instructions are further executable to select an additional offset according to a processing time capability of the UE. Additionally, the instructions are further executable to transmit, at a timing offset in relation to the plurality of PDCCH transmissions, a HARQ-ACK. The timing offset comprises a sum of the base offset and the additional offset.

Another example aspect includes a method of wireless communication by a base station of a wireless communication network, comprising transmitting, to a UE, configuration information indicating that PDCCH JCE is enabled for a plurality of PDCCH monitoring occasions. The method further includes transmitting, to the UE, a plurality of PDCCH transmissions. The plurality of PDCCH transmissions being transmitted during the plurality of PDCCH monitoring occasions. At least one PDCCH transmission comprises a HARQ-ACK request without a corresponding PDSCH grant. Additionally, the method further includes receiving, at a timing offset in relation to the plurality of PDCCH transmissions, a HARQ-ACK. The timing offset comprises a sum of a base offset and an additional offset. The base offset having been identified according to the at least one PDCCH transmission. The additional offset having been selected according to a processing time capability of the UE.

Another example aspect includes an apparatus for wireless communication by a base station of a wireless communication network, comprising a memory and a processor communicatively coupled with the memory. The processor is configured to transmit, to a UE, configuration information indicating that PDCCH JCE is enabled for a plurality of PDCCH monitoring occasions. The processor is further configured to transmit, from the base station, a plurality of PDCCH transmissions. The plurality of PDCCH transmissions being transmitted during the plurality of PDCCH monitoring occasions. At least one PDCCH transmission comprises a HARQ-ACK request without a corresponding PDSCH grant. Additionally, the processor is further configured to receive, at a timing offset in relation to the plurality of PDCCH transmissions, a HARQ-ACK. The timing offset comprises a sum of a base offset and an additional offset. The base offset having been identified according to the at least one PDCCH transmission. The additional offset having been selected according to a processing time capability of the UE.

Another example aspect includes an apparatus for wireless communication by a base station of a wireless communication network, comprising means for transmitting, to a UE, configuration information indicating that PDCCH JCE is enabled for a plurality of PDCCH monitoring occasions. The apparatus further includes means for transmitting, to the UE, a plurality of PDCCH transmissions. The plurality of PDCCH transmissions being transmitted during the plurality of PDCCH monitoring occasions. At least one PDCCH transmission comprises a HARQ-ACK request without a corresponding PDSCH grant. Additionally, the apparatus further includes means for receiving, at a timing offset in relation to the plurality of PDCCH transmissions, a HARQ-ACK. The timing offset comprises a sum of a base offset and an additional offset. The base offset having been identified according to the at least one PDCCH transmission. The additional offset having been selected according to a processing time capability of the UE.

Another example aspect includes a computer-readable medium (e.g., non-transitory computer-readable medium) storing instructions for wireless communication by a base station of a wireless communication network, executable by a processor, to transmit, to a UE, configuration information indicating that PDCCH JCE is enabled for a plurality of PDCCH monitoring occasions. The instructions are further executable to transmit, from the base station, a plurality of PDCCH transmissions. The plurality of PDCCH transmissions being transmitted during the plurality of PDCCH monitoring occasions. At least one PDCCH transmission comprises a HARQ-ACK request without a corresponding PDSCH grant. Additionally, the instructions are further executable to receive, at a timing offset in relation to the plurality of PDCCH transmissions, a HARQ-ACK. The timing offset comprises a sum of a base offset and an additional offset. The base offset having been identified according to the at least one PDCCH transmission. The additional offset having been selected according to a processing time capability of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIG. 7A is a diagram illustrating PDCCH DMRS bundling across PDCCH repetitions, in accordance with various aspects of the present disclosure.

FIG. 7B is a diagram illustrating PDCCH DMRS bundling across PDCCH monitoring occasions (PMOs), in accordance with various aspects of the present disclosure.

DETAILED DESCRIPTION

Figure 1:
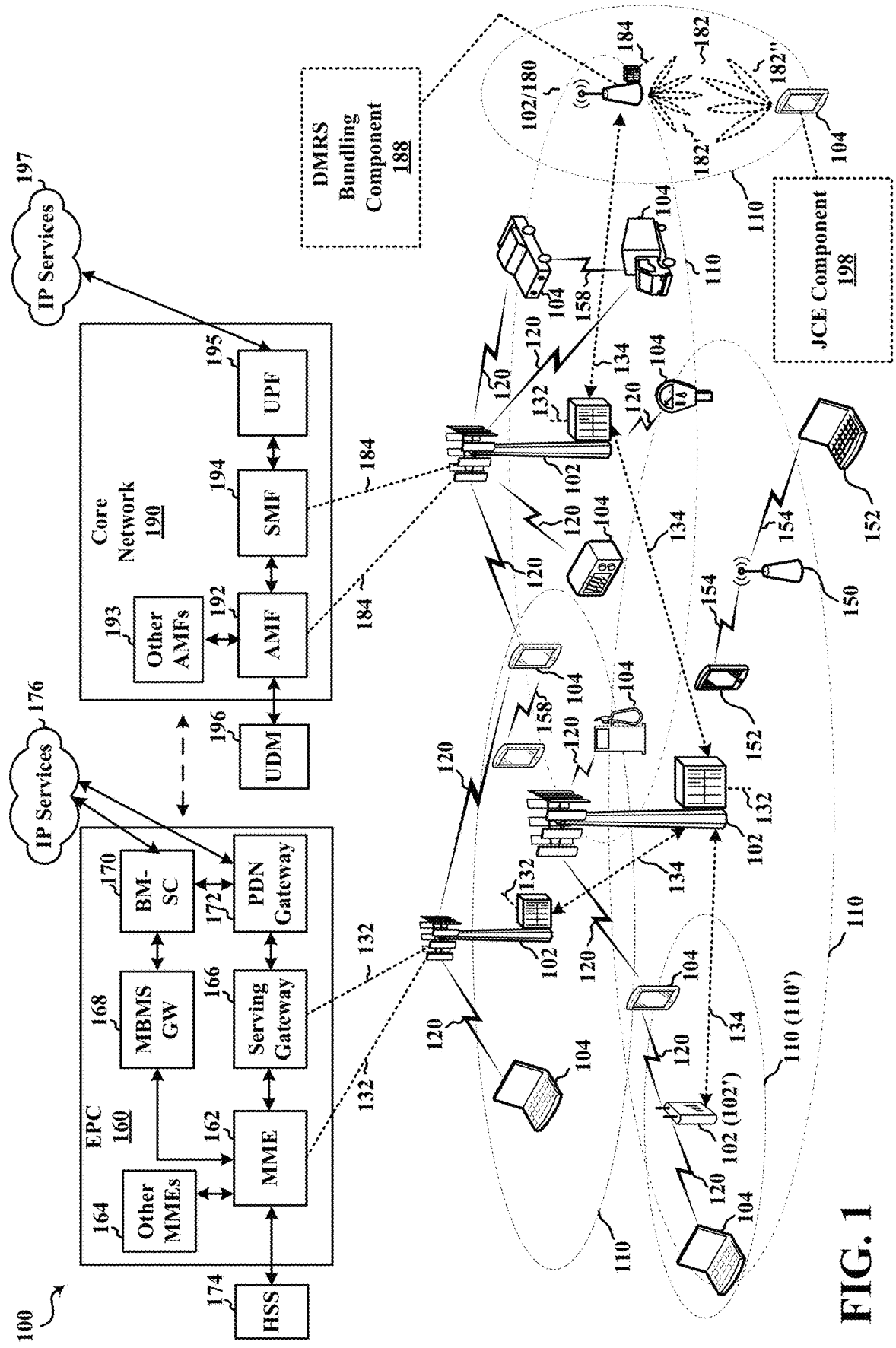
FIG. 1 is a diagram illustrating an example of a wireless communication system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Wireless devices in a wireless communication system may perform channel estimation to potentially improve performance of signals communicated via a wireless channel. For instance, a wireless device (e.g., user equipment (UE)) may receive, from a network node (e.g., base station), one or more reference signals with which the wireless device may perform the channel estimation. For example, the wireless device may receive one or more demodulation reference signals (DMRS) via a physical downlink control channel (PDCCH) with which the wireless device may perform channel estimation of the PDCCH.

In some aspects, the results from the channel estimation may be used to select one or more configuration parameters (e.g., performance related) for the wireless channel (e.g., PDCCH), such as a modulation and coding scheme. As such, channel estimation errors may result in significant performance degradation of the wireless channel. In some aspects, the accuracy of the channel estimation may be potentially enhanced by the use of DMRS bundling. For example, the wireless device may perform joint channel estimation (JCE) on the DMRS signals across multiple PDCCH monitoring occasions. Such procedures may improve the accuracy of the channel estimation, and, consequently may enhance PDCCH coverage and/or performance.

Alternatively or additionally, one or more of the multiple PDCCH monitoring occasions may carry an acknowledgment request (e.g., hybrid automatic repeat request (HARD) ACK/NACK feedback) without a corresponding resource allocation (e.g., scheduling information) for the requested acknowledgment transmission. For example, a PDCCH monitoring occasion may comprise a downlink control information (DCI) requesting a HARQ-ACK transmission but no physical downlink shared channel (PDSCH) may be scheduled by the DCI. Thus, this scenario potentially increases latency and reduces efficiency of the wireless communication system.

Aspects presented herein provide for multiple manners for identifying and selecting a timing offset in relation to the PDCCH monitoring occasions for transmitting the HARQ-ACK if or when the HARQ-ACK is requested without a corresponding PDSCH grant. In some aspects, the timing offset may be identified according to a HARQ-ACK request type. In other aspects, the timing offset may be selected according to a processing time capability of the wireless device (e.g., UE). Further, aspects presented herein may potentially reduce latency and increase spectrum efficiency, when compared to conventional wireless communication systems.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In some aspects, the base station 102 may include a demodulation reference signals (DMRS) bundling component 188. The DMRS bundling component 188 may be configured to transmit a plurality of physical downlink control channel (PDCCH) transmissions that may be used for joint channel estimation (JCE). For example, the DMRS bundling component 188 may transmit configuration information indicating that PDCCH JCE is enabled for a plurality of PDCCH monitoring occasions.

Similarly, the UE 104 may include a JCE component 198. The JCE component 198 may be configured to perform JCE on a plurality of PDCCH transmissions. For example, the JCE component 198 may transmit, at a timing offset in relation to the plurality of PDCCH transmissions, a HARQ-ACK.

The base stations 102 may include macrocells (high power cellular base station) and/or small cells (low power cellular base station). The macrocells may include base stations. The small cells may include femtocells, picocells, and microcells. The base stations 102 may be configured for 4G LTE (collectively referred to as Evolved Universal Mobile Telecommunication System (UMTS) Terrestrial Radio Access Network (E-UTRAN)) and may interface with the EPC 160 through first backhaul links 132 (e.g., S1 interface), which may be wired or wireless. The base stations 102 may be configured for 5G NR (collectively referred to as Next Generation RAN (NG-RAN)) and may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform a clear channel assessment (CCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (186 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 to communicate with another UE 104, such as based on sidelink, V2X, V2V, or D2D communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system 100 described above in FIG. 1. The resources may be time-based, frequency-based, or both on time and frequency.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through DCI, or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. In such an example, the slot duration may be 0.25 milliseconds, the subcarrier spacing may be 60 kHz, and the symbol duration may be approximately 16.67 microseconds ($\mu$s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
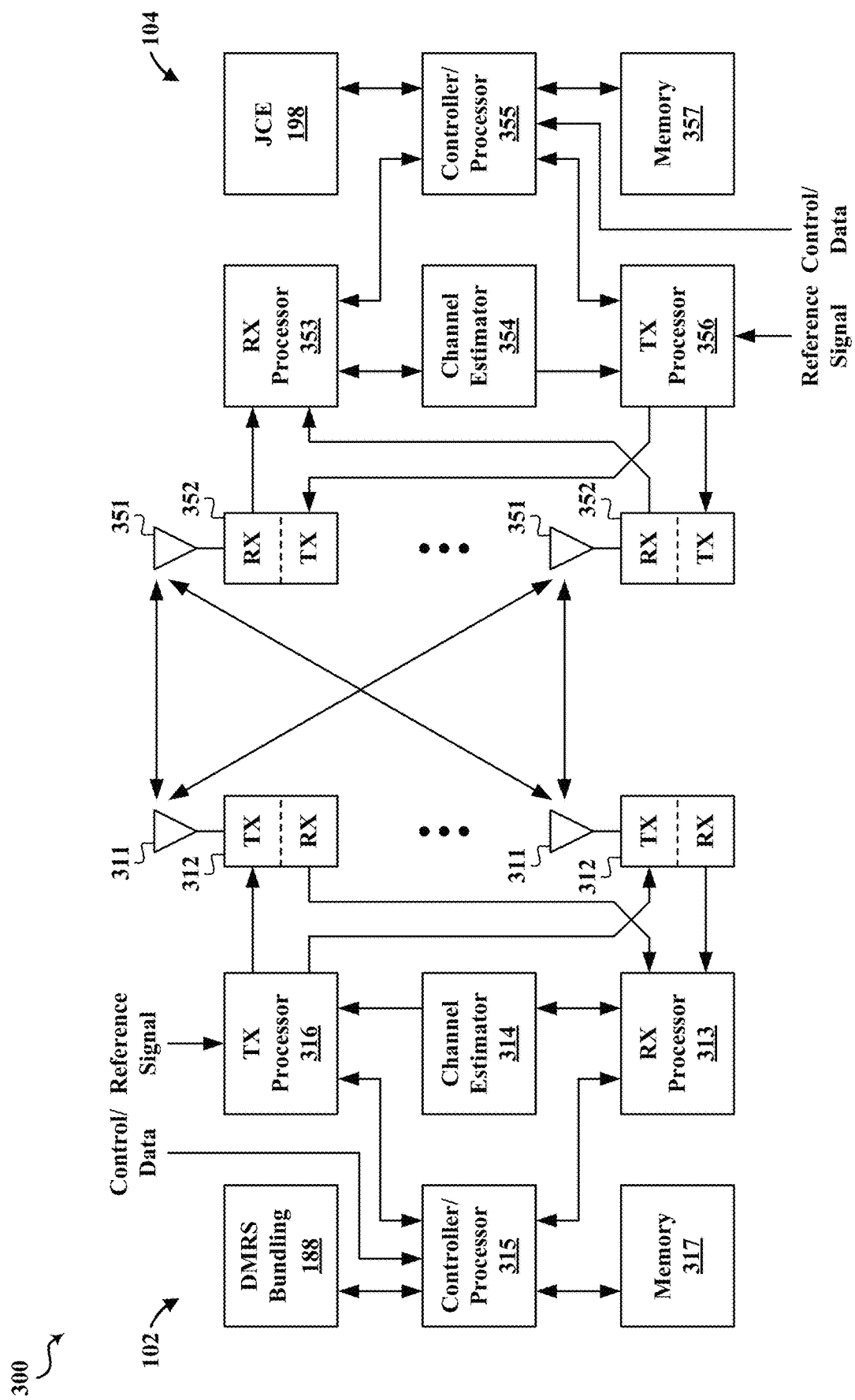
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in the wireless communication system 100. In the downlink, IP packets from the EPC 160 may be provided to a controller/processor 315. The controller/processor 315 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 315 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 313 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream may be spatially precoded to produce multiple spatial streams. Channel estimates from a channel estimator 314 may be used to determine the coding and modulation scheme, as well as for spatial processing. The channel estimate may be derived from a reference signal and/or channel condition feedback transmitted by the UE 104. Each spatial stream may then be provided to a different antenna 311 via a separate transmitter 312TX. Each transmitter 312TX may modulate an RF carrier with a respective spatial stream for transmission.

At the UE 104, each receiver 352RX may receive a signal through its respective antenna 351. Each receiver 352RX may recover information modulated onto an RF carrier and may provide the information to the receive (RX) processor 353. The TX processor 356 and the RX processor 353 may implement Layer 1 functionality associated with various signal processing functions. The RX processor 353 may perform spatial processing on the information to recover any spatial streams destined for the UE 104. If or when multiple spatial streams are destined for the UE 104, the multiple spatial streams may be combined by the RX processor 353 into a single OFDM symbol stream. The RX processor 353 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 354. The soft decisions may then be decoded and deinterleaved to recover the data and control signals that were originally transmitted by the base station 102 on the physical channel. The data and control signals may then be provided to the controller/processor 355, which may implement Layer 3 and Layer 2 functionality.

The controller/processor 355 can be associated with a memory 357 that stores program codes and data. The memory 357 may be referred to as a non-transitory computer-readable medium. The controller/processor 355 may provide demultiplexing between transport and logical channels, packet reassembly, deciphering, header decompression, and control signal processing to recover IP packets from the EPC 160. The controller/processor 355 is also responsible for error detection using an acknowledge (ACK) and/or negative acknowledge (NACK) protocol to support HARQ operations.

Similar to the functionality described in connection with the transmission by base station 102, the controller/processor 355 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 354 from a reference signal or feedback transmitted by the base station 102 may be used by the TX processor 356 to select the appropriate coding and modulation schemes, and to facilitate spatial processing. The spatial streams generated by the TX processor 356 may be provided to different antenna 351 via separate transmitters 352TX. Each transmitter 352TX may modulate an RF carrier with a respective spatial stream for transmission.

The uplink transmission may be processed at the base station 102 in a manner similar to that described in connection with the receiver function at the UE 104. Each receiver 312RX may receive a signal through its respective antenna 311. Each receiver 312RX may recover information modulated onto an RF carrier and may provide the information to a RX processor 313.

The controller/processor 315 may be associated with, and coupled with, a memory 317 that stores program codes and data. The memory 317 may be referred to as a non-transitory computer-readable medium. The controller/processor 315 may provide demultiplexing between transport and logical channels, packet reassembly, deciphering, header decompression, control signal processing to recover IP packets from the UE 104. IP packets from the controller/processor 315 may be provided to the EPC 160. The controller/processor 315 may also be responsible for error detection using an ACK and/or NACK protocol to support HARQ operations.

In some aspects, the base station 102 may include a DMRS bundling component 188. The DMRS bundling component 188 may be configured to transmit a plurality of PDCCH transmissions that may be used for JCE. For example, the DMRS bundling component 188 may transmit configuration information indicating that PDCCH JCE is enabled for a plurality of PDCCH monitoring occasions.

In other aspects, at least one of the TX processor 316, the RX processor 313, and the controller/processor 315 may be configured to perform aspects in connection with the DMRS bundling component 188. For example, the memory 317 may store computer-executable instructions defining the DMRS bundling component 188. In other aspects, the TX processor 316, the RX processor 313, and/or the controller/processor 315 may be configured to execute the DMRS bundling component 188.

In some aspects, the UE 104 may include a JCE component 198. The JCE component 198 may be configured to perform JCE on a plurality of PDCCH transmissions. For example, the JCE component 198 may transmit, at a timing offset in relation to the plurality of PDCCH transmissions, a HARQ-ACK.

In other aspects, at least one of the TX processor 356, the RX processor 353, and the controller/processor 355 may be configured to perform aspects in connection with the JCE component 198. For example, the memory 357 may store computer-executable instructions defining the JCE component 198. In other aspects, the TX processor 356, the RX processor 353, and/or the controller/processor 355 may be configured to execute the JCE component 198.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
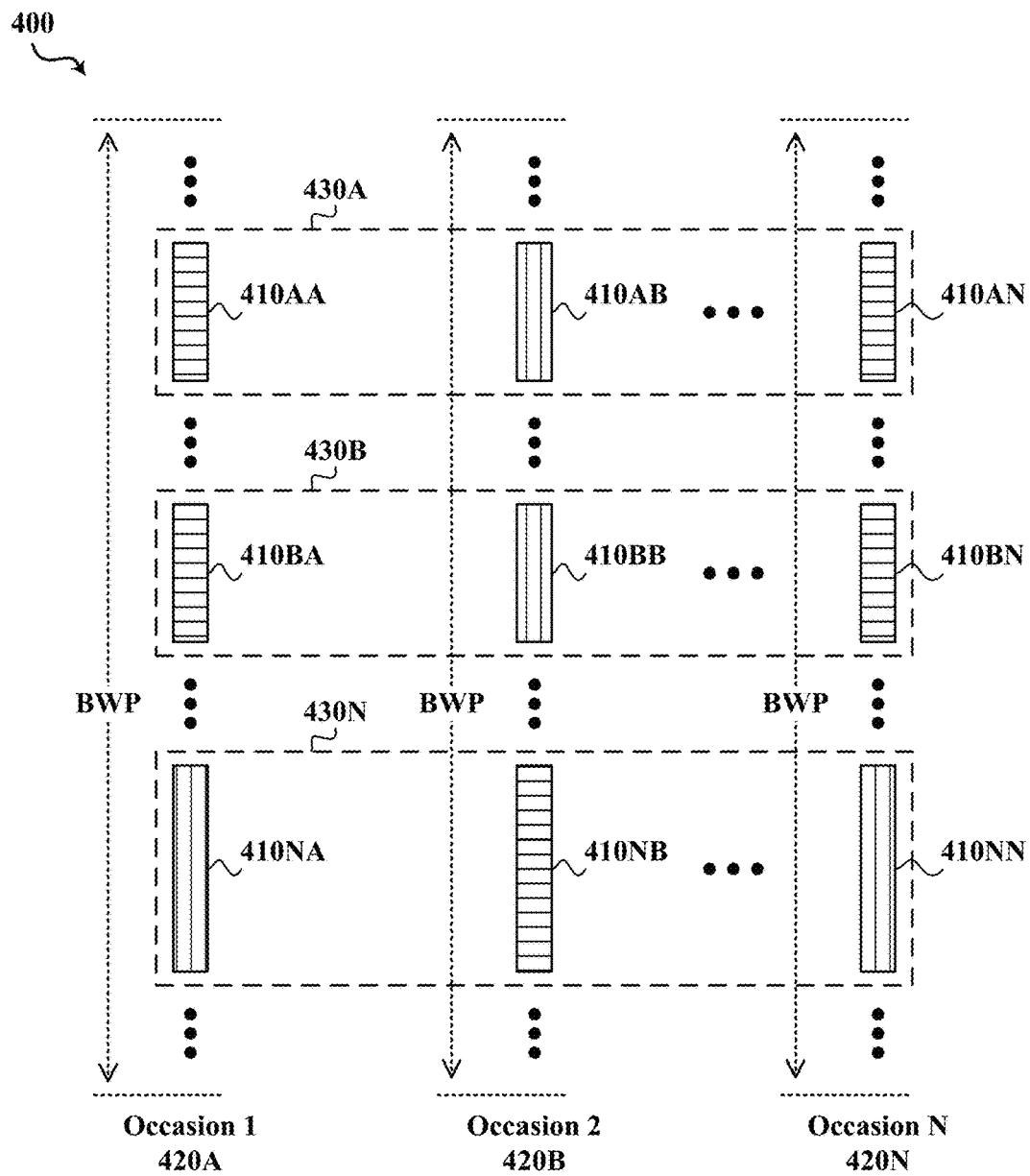
FIG. 4 is a diagram illustrating a first example of joint channel estimation (JCE) for a physical downlink control channel (PDCCH) using demodulation reference signals (DMRS) bundling, in accordance with various aspects of the present disclosure.

FIG. 4 is a diagram 400 illustrating a first example of joint channel estimation (JCE) for a physical downlink control channel (PDCCH) using demodulation reference signals (DMRS) bundling. The JCE example depicted in FIG. 4 may be implemented by a wireless communication system, such as the wireless communication system 100 of FIG. 1. For example, a network device (e.g., base station 102 and/or gNB 180, as shown in FIGS. 1 and 3) may be configured to transmit, via the PDCCH to a UE 104, one or more control channel elements (CCEs) 410AA-410NN (hereinafter "410") across multiple occasions 420A-420N (hereinafter "420"). As shown in FIG. 4, a portion of the CCEs 410 may carry control information (e.g., DCI), such as CCEs 410AA, 410AN, 410BA, 410BN, and 410NB, for example, in addition to carrying a DMRS. Alternatively or additionally, the remaining CCEs, such as 410AB, 410BB, 410NA, and 410NN, for example, may not carry control information and may only carry a DMRS. That is, each CCE 410 may carry a DMRS and may or may not carry control information (e.g., DCI).

In some aspects, the base station 102 may comprise a DMRS bundling component 188 (shown in FIG. 1) and the UE 104 may comprise a JCE component 198 (shown in FIG. 1).

As described above in reference to FIG. 2B, a PDCCH within one bandwidth part (BWP) may be referred to as a control resource set (CORESET). The UE 104 may be configured to monitor, according to the CORESET, for PDCCH candidate transmissions within a PDCCH search space (e.g., common search space, UE-specific search space) during PDCCH monitoring occasions corresponding to the CCEs 410. In some aspects, the UE 104 may be configured to perform channel estimation of the PDCCH using the DMRSs carried by the CCEs 410. The channel estimation may be used to determine one or more configuration parameters for the PDCCH, such as a coding and modulation scheme. Alternatively or additionally, the UE 104 may be configured to demodulate and/or to decode signals received via the PDCCH according to the channel estimation. For example, the UE 104 may demodulate and/or decode the PDCCH signals using the coding and modulation scheme determined using the channel estimation.

As such, channel estimation errors may result in significant performance degradation of the PDCCH (e.g., loss of coverage). In some aspects, the accuracy of the channel estimation may be potentially enhanced by the use of DMRS bundling. For example, the UE 104 may perform JCE on the DMRS bundles 430A-430N (hereinafter "430") across multiple PDCCH monitoring occasions 420. That is, the UE 104 may perform JCE on the DMRS signals carried by the CCEs 410 comprised by a DMRS bundle 430. For example, the UE 104 may perform JCE on the DMRS signals carried by CCEs 410AA-410AN. In another example, the UE 104 may perform JCE on the DMRS signals carried by CCEs 410BA- 410BN. In another example, the UE 104 may perform JCE on the DMRS signals carried by CCEs 410NA-410NN.

In some aspects, the base station 102 may be configured to maintain one or more configuration parameters constant across the CCEs 410 comprised by each DMRS bundle 430. For example, the base station 102 may transmit CCEs 410AA-410AN, 410BA-410BN, or 410NA-410NN, at a same transmit power level and/or a same resource allocation. Alternatively or additionally, the base station 102 may be configured to maintain phase continuity across the CCEs 410 comprised by each DMRS bundle 430. For example, the base station 102 may be configured to maintain phase continuity across the DMRS carried by the CCEs 410AA-410AN, 410BA-410BN, and 410NA-410NN, respectively. As a result, the respective DMRS of each DMRS bundle 430 may be coherently combined by the UE 104 over the multiple PDCCH monitoring occasions 420 (e.g., CCEs 410AA-410AN, 410BA-410BN, and 410NA-410NN).

Such JCE procedures may improve the accuracy of the channel estimation, and, consequently may enhance PDCCH coverage and/or performance. Consequently, these techniques may enhance PDCCH coverage for low-tier user equipment (e.g., UE having a reduced number (e.g., one) of receive antennas), user equipment located in deep coverage holes, and/or user equipment located at a cell edge.

It may be understood that the JCE example depicted in FIG. 4 is only one example of a PDCCH configuration that may be utilized without departing from the scope described herein. For example, other combinations of CCEs comprising control information (e.g., DCI) and/or amounts of CCEs may be utilized.

Figure 5:
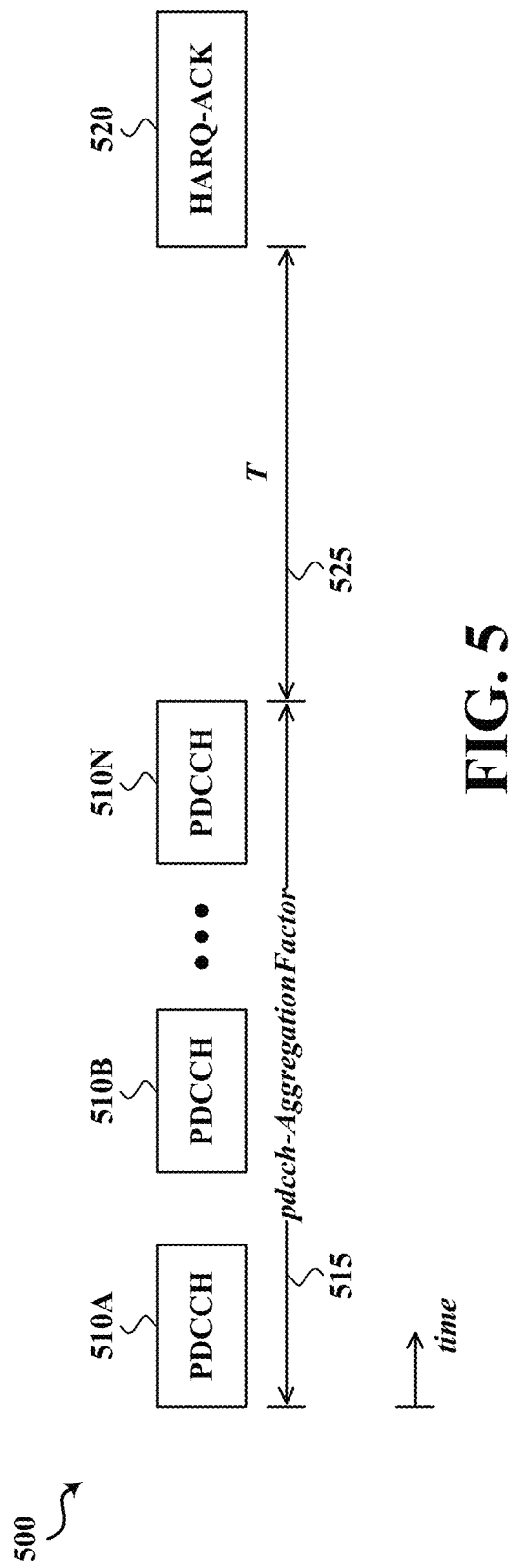
FIG. 5 is a diagram illustrating a second example of JCE for a PDCCH using DMRS bundling, in accordance with various aspects of the present disclosure.

FIG. 5 is a diagram 500 illustrating a second example of JCE for a PDCCH using DMRS bundling. The JCE example depicted in FIG. 5 may be implemented by a wireless communication system, such as the wireless communication system 100 of FIG. 1. In some aspects, the base station 102 may comprise a DMRS bundling component 188 (shown in FIG. 1) and the UE 104 may comprise a JCE component 198 (shown in FIG. 1).

The base station 102 may be configured to transmit, to the UE 104, two or more PDCCH repetitions. That is, the base station 102 may transmit, via the PDCCH, a same CCE multiple times to the UE 104. For example, CCEs 510A-510N (hereinafter "510") may comprise a same DMRS and/or a same control information (e.g., DCI).

Alternatively or additionally, the PDCCH repetitions may be within a same slot and/or the PDCCH repetitions may span across multiple slots. That is, the CCEs 510 may be transmitted within a same slot and/or may be transmitted across multiple slots.

As shown in FIG. 5, the base station 102 may transmit the PDCCH repetitions (e.g., CCEs 510) according to a slot aggregation factor 515. For example, the base station 102 may transmit control information (e.g., DCI) to the UE 104 indicating a value (e.g., pdcch-AggregationFactor) corresponding to the number of PDCCH repetitions to be transmitted by the base station 102.

In some aspects, the base station 102 may transmit at least one PDCCH 510 comprising hybrid automatic repeat request (HARD) acknowledgement (ACK) request without a corresponding physical downlink shared channel (PDSCH) grant. For example, the base station 102 may transmit, via the PDCCH to the UE 104, a DCI requesting a HARQ-ACK transmission without a corresponding allocation and/or scheduling of PDSCH resources for transmitting the HARQ-ACK. The UE 104 may transmit, in response to the request, a HARQ-ACK/NACK response 520 based on results of decoding the PDCCH transmissions.

As described in further detail in reference to FIGS. 6A-6D, the PDCCH transmission requesting the HARQ-ACK may comprise one or more request types, such as a PDCCH carrying a semi-persistent scheduling (SPS) PDSCH release, a PDCCH carrying a Type-3 HARQ-ACK codebook request, a PDCCH carrying a secondary cell (SCell) dormancy indication, and/or a DCI overriding a current physical uplink control channel (PUCCH) resource allocation for transmission of the HARQ-ACK response 520.

The UE 104 may be configured to perform JCE on the DMRS bundled by the PDCCH repetitions (e.g., CCEs 510). That is, the UE 104 may perform channel estimation using the DMRS comprised by the CCEs 510.

The UE 104 may be configured to transmit the HARQ-ACK response 520 according to the request type transmitted by the base station 102 if or when the HARQ-ACK request does not have a corresponding resource allocation and/or scheduling for transmitting the HARQ-ACK response 520. That is, the UE 104 may transmit the HARQ-ACK response 520 at a timing offset T 525 based on results of decoding the PDCCH transmissions. The timing offset T 525 may be determined at least in part based on the request type transmitted by the base station 102. However, in some aspects, the timing offset T 525 may not account for a processing time by the UE 104 of the PDCCH and the PDSCH transmissions. For example, a processing timeline of the PDCCH transmissions may be impacted by the JCE performed by the UE 104 on the DMRS carried by the PDCCH transmissions. Alternatively or additionally, the processing time may be affected by a processing capability of the UE 104. That is, if or when the UE 104 has a reduced processing capability (e.g., UE processing capability of 2), the UE 104 may require additional processing time when compared with another UE 104 having a more advanced UE processing capability.

Alternatively or additionally, the UE 104 may be configured to transmit the HARQ-ACK response 520 according to a resource allocation and/or scheduling transmitted by the base station 102 if or when the HARQ-ACK request does have a corresponding resource allocation and/or scheduling for transmitting the HARQ-ACK response 520. In such aspects, the resource allocation and/or scheduling of the HARQ-ACK response 520 may account for processing time by the UE 104 of the PDCCH and the PDSCH transmissions.

It may be understood that the JCE example depicted in FIG. 5 is only one example of a PDCCH configuration that may be utilized without departing from the scope described herein. For example, other combinations of CCEs comprising control information (e.g., DCI) and/or amounts of CCEs may be utilized.

Referring to FIGS. 6A-6D, the diagrams 600, 620, 640, and 660 illustrate examples of PDCCH transmissions comprising respective HARQ-ACK request types. The example PDCCH transmissions may be implemented by a wireless communication system, such as the wireless communication system 100 of FIG. 1. In some aspects, the base station 102 may comprise a DMRS bundling component 188 (shown in FIG. 1) and the UE 104 may comprise a JCE component 198 (shown in FIG. 1).

Figure 6A:
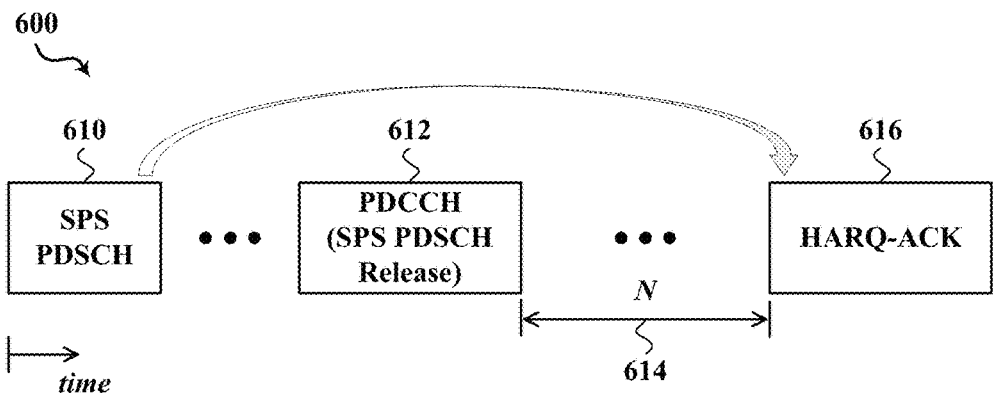
FIG. 6A is a diagram illustrating PDCCH transmissions with a semi-persistent scheduling (SPS) physical downlink shared channel (PDSCH) activation and release, in accordance with various aspects of the present disclosure.

FIG. 6A illustrates a diagram 600 of PDCCH transmissions with a SPS PDSCH activation and a SPS PDSCH release. For example, the base station 102 may transmit, to the UE 104, a SPS PDSCH activation indication 610 (e.g., DCI). That is, the base station 102 may configure the UE 104 to start monitoring PDSCH occasions using the SPS PDSCH activation indication 610.

In some aspects, the base station 102 may transmit, to the UE 104, a PDCCH 612 carrying a SPS PDSCH release. The base station 102 may transmit the SPS PDSCH release at a time point after the transmission of the SPS PDSCH activation indication 610, as shown in FIG. 6A.

In other aspects, the base station 102 may transmit the PDCCH 612 as part of transmitting the CCEs 410 of FIG. 4 and/or transmitting the CCEs 510 of FIG. 5. That is, one or more of the CCEs 410, 510 described above in reference to FIGS. 4 and 5 may carry a SPS PDSCH release.

In other aspects, the UE 104 may be configured to transmit, to the base station 102, a PUCCH carrying HARQ-ACK information 616 in response to the SPS PDSCH release. The UE 104 may be configured to transmit the HARQ-ACK information 616 after N symbols 614 have elapsed from the last symbol of the PDCCH 620 providing the SPS PDSCH release, wherein N is a value greater than zero. In some aspects, the value of N may be selected according to an advanced processing capability configuration of the UE 104 and/or a numerology configuration of the serving cell (e.g., sub-carrier spacing (SCS), symbol length/duration). For example, if or when the advanced processing time capability is enabled for PDSCH (e.g., processingType2Enabled of PDSCH-ServingCellConfig is set to enable) for the serving cell with the PDCCH providing the SPS PDSCH release, then N may be set to 5 for $\mu=0$, N may be set to 5.5 for $\mu=1$, and/or N may be set to 11 for $\mu=2$. $\mu$ may correspond to the smallest SCS configuration between the SCS configuration of the PDCCH 612 providing the SPS PDSCH release and the SCS configuration of the PUCCH carrying the HARQ-ACK information 616 in response to a SPS PDSCH release. Alternatively or additionally, if or when the advanced processing capability is disabled (e.g., processingType2Enabled of PDSCH-ServingCellConfig is set to disable), then N may be set to 10 for $\mu=0$, N may be set to 12 for $\mu=1$, and/or N may be set to 22 for $\mu=2$.

It may be understood that the mappings between N values and numerology described above are only one set of examples that may be utilized without departing from the scope described herein. For example, other mappings with different N values and/or different numerology configurations may be utilized.

Figure 6B:
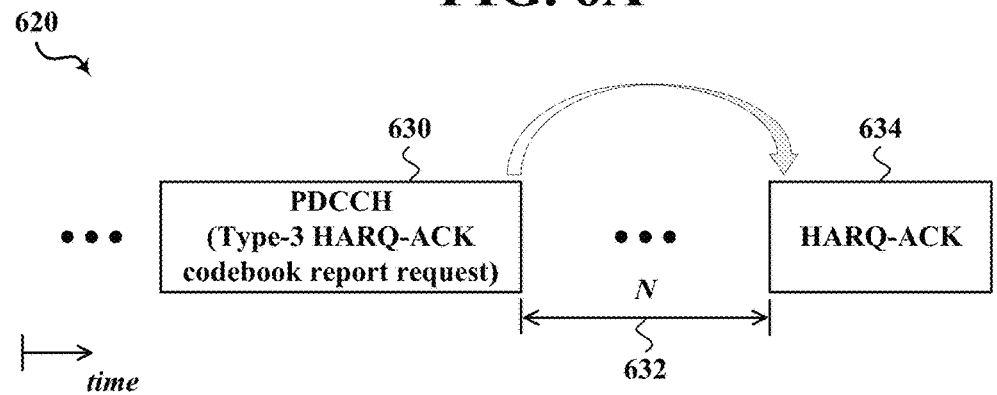
FIG. 6B is a diagram illustrating a PDCCH transmission carrying a Type-3 hybrid automatic repeat request (HARQ) acknowledgement (ACK) codebook request, in accordance with various aspects of the present disclosure.

FIG. 6B illustrates a diagram 620 of a PDCCH transmission carrying a Type-3 HARQ-ACK codebook request. For example, the base station 102 may transmit, to the UE 104, PDCCH 630 carrying the Type-3 HARQ-ACK codebook request. In some aspects, the base station 102 may be configured to transmit the Type-3 HARQ-ACK codebook request if or when retransmission of the HARQ-ACK may be needed. For example, retransmission of the HARQ-ACK may be needed if or when an initial transmission of the HARQ-ACK failed due to interference and/or listen-before-talk (LBT) failures, for example. The Type-3 HARQ-ACK codebook request may be indicated by a bit value in a DCI format. That is, the PDCCH 630 may carry the DCI format indicating the Type-3 HARQ-ACK codebook request.

Alternatively or additionally, the DCI format may provide a request for a Type-3 HARQ-ACK codebook report and may not schedule a PDSCH reception if or when:
 the UE 104 detects a DCI format that includes a One-shot HARQ-ACK request field with value 1, and
 the CRC of the DCI is scrambled by a C-RNTI or an MCS-C-RNTI, and resourceAllocation=resourceAllocationType0 and all bits of the frequency domain resource assignment field in the DCI format are equal to 0, or
resourceAllocation=resourceAllocationType1 and all bits of the frequency domain resource assignment field in the DCI format are equal to 1, or
resourceAllocation=dynamicSwitch and all bits of the frequency domain resource assignment field in the DCI format are equal to 0 or 1.

In other aspects, the base station 102 may transmit the PDCCH 630 carrying the Type-3 HARQ-ACK codebook request as part of transmitting the CCEs 410 of FIG. 4 and/or transmitting the CCEs 510 of FIG. 5. That is, one or more of the CCEs 410, 510 described above in reference to FIGS. 4 and 5 may carry a Type-3 HARQ-ACK codebook request.

In some aspects, the UE 104 may be configured to transmit, to the base station 102, a PUCCH carrying HARQ-ACK information 634 in response to the Type-3 HARQ-ACK codebook request. The HARQ-ACK information 634 may comprise information corresponding to all HARQ processes across all component carriers (CC) of the serving cell. Alternatively or additionally, the HARQ-ACK information 634 may report a codebook size of the Type-3 HARQ-ACK codebook.

Alternatively or additionally, the UE 104 may be configured to transmit the HARQ-ACK information 634 after N symbols 632 have elapsed from the last symbol of the PDCCH 630 providing the Type-3 HARQ-ACK codebook request, wherein N is a value greater than zero. In some aspects, the value of N may be selected according to an advanced processing capability configuration of the UE 104 and/or a numerology configuration of the serving cell (e.g., SCS, symbol length/duration). For example, if or when the advanced processing time capability is enabled for PDSCH (e.g., processingType2Enabled of PDSCH-ServingCellConfig is set to enable) for the serving cell with the PDCCH 630 providing the Type-3 HARQ-ACK codebook request, then N may be set to 5 for $\mu=0$, N may be set to 5.5 for $\mu=1$, and/or N may be set to 11 for $\mu=2$. $\mu$ may correspond to the smallest SCS configuration between the SCS configuration of the PDCCH 630 providing the Type-3 HARQ-ACK codebook request and the SCS configuration of the PUCCH carrying the HARQ-ACK information 634 in response to a Type-3 HARQ-ACK codebook request. Alternatively or additionally, if or when the advanced processing capability is disabled (e.g., processingType2Enabled of PDSCH-ServingCellConfig is set to disable), then N may be set to 10 for $\mu=0$, N may be set to 12 for $\mu=1$, and/or N may be set to 22 for $\mu=2$.

It may be understood that the mappings between N values and numerology described above are only one set of examples that may be utilized without departing from the scope described herein. For example, other mappings with different N values and/or different numerology configurations may be utilized.

Figure 6C:
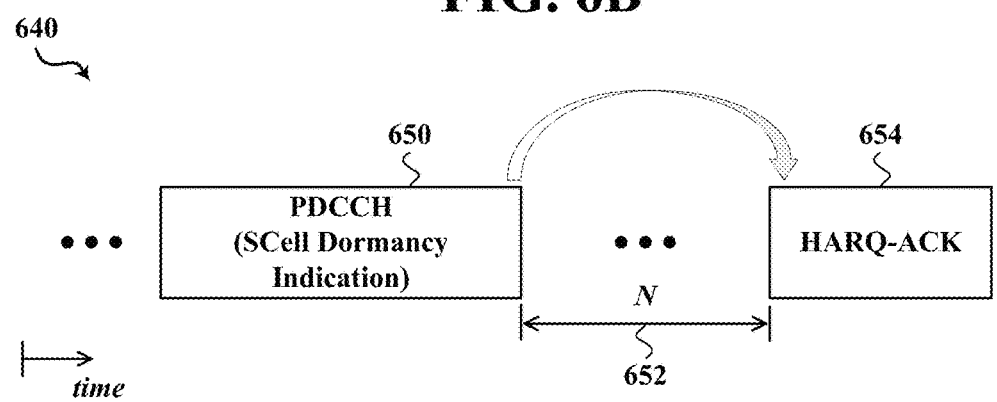
FIG. 6C is a diagram illustrating a PDCCH transmission with a secondary cell (SCell) dormancy indication, in accordance with various aspects of the present disclosure.

FIG. 6C illustrates a diagram 640 of a PDCCH transmission carrying an SCell dormancy indication. For example, the base station 102 may transmit, to the UE 104, PDCCH 650 carrying the SCell dormancy indication.

The SCell dormancy indication may be indicated by a bit value in a DCI format. That is, the PDCCH 650 may carry the DCI format indicating the SCell dormancy indication. The SCell dormancy indication may be transmitted over the primary cell to instruct the UE 104 to switch to/from a dormant BWP configured for the SCell. For example, the UE 104 may be configured with two or more SCells, such as in carrier aggregation (CA), and the SCell dormancy indication may instruct the UE 104 whether to start and/or stop monitoring PDCCH transmissions of an SCell to conserve power. That is, the UE 104 may perform necessary measurements (e.g., channel state, beam measurements) on the SCell if or when the SCell is in an active state, and/or the UE 104 may stop performing measurements on the SCell if or when the SCell is in a dormant state.

In some aspects, the base station 102 may transmit the PDCCH 650 carrying the SCell dormancy indication request as part of transmitting the CCEs 410 of FIG. 4 and/or transmitting the CCEs 510 of FIG. 5. That is, one or more of the CCEs 410, 510 described above in reference to FIGS. 4 and 5 may carry a SCell dormancy indication.

In other aspects, the UE 104 may be configured to transmit the HARQ-ACK information 654 after N symbols 652 have elapsed from the last symbol of the PDCCH 650 providing the SCell dormancy indication request, wherein N is a value greater than zero. In some aspects, the value of N may be selected according to an advanced processing capability configuration of the UE 104 and/or a numerology configuration of the serving cell (e.g., SCS, symbol length/duration). For example, if or when the advanced processing time capability is enabled for PDSCH (e.g., processingType2Enabled of PDSCH-ServingCellConfig is set to enable) for the serving cell with the PDCCH 650 providing the SCell dormancy indication request, then N may be set to 7 for $\mu=0$, N may be set to 7.5 for $\mu=1$, and/or N may be set to 15 for $\mu=2$. $\mu$ may correspond to the smallest SCS configuration between the SCS configuration of the PDCCH 650 providing the SCell dormancy indication request and the SCS configuration of the PUCCH carrying the HARQ-ACK information 654 in response to a SCell dormancy indication request. Alternatively or additionally, if or when the advanced processing capability is disabled (e.g., processingType2Enabled of PDSCH-ServingCellConfig is set to disable), then N may be set to 14 for $\mu=0$, N may be set to 16 for $\mu=1$, and/or N may be set to 27 for $\mu=2$.

It may be understood that the mappings between N values and numerology described above are only one set of examples that may be utilized without departing from the scope described herein. For example, other mappings with different N values and/or different numerology configurations may be utilized.

Figure 6D:
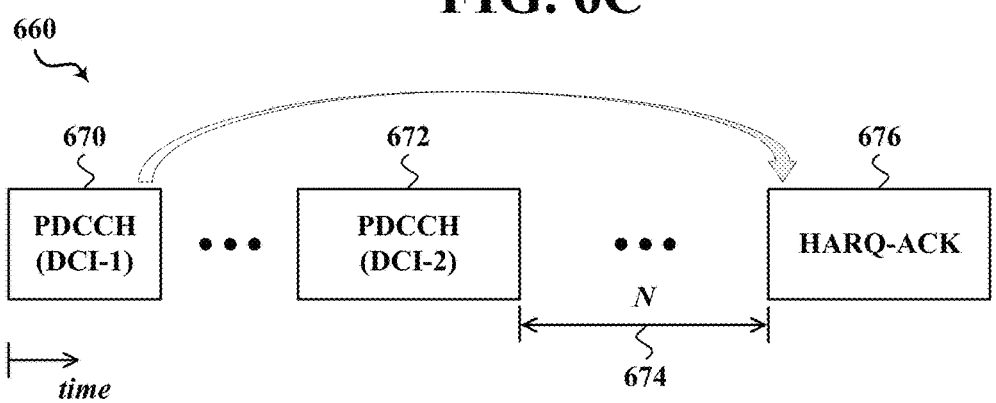
FIG. 6D is a diagram illustrating a PDCCH transmission carrying a DCI overriding a current physical uplink control channel (PUCCH) resource allocation for transmission of the HARQ-ACK response, in accordance with various aspects of the present disclosure.

FIG. 6D illustrates a diagram 660 of a PDCCH transmission carrying a DCI overriding a current PUCCH resource allocation for transmission of the HARQ-ACK response. For example, the base station 102 may transmit, to the UE 104, a first PDCCH 670 scheduling a HARQ-ACK response and, at a later point in time, the base station 102 may transmit a second PDCCH 672 overriding the initial scheduling of the HARQ-ACK response.

In some aspects, the base station 102 may transmit, to the UE 104, first PDCCH 670 carrying a first DCI indicating a particular slot n for the HARQ-ACK transmission 676 (e.g., K1 field of DCI) and indicating a first PUCCH resource of the particular slot n (e.g., PRI field of DCI). The base station 102 may further transmit, at a later time, a second PDCCH 672 carrying a second DCI indicating the same slot n for the HARQ-ACK transmission 676 and indicating a second PUCCH resource that is different from the first PUCCH resource.

In other aspects, the base station 102 may transmit the first PDCCH 670 and the second PDCCH 672 as part of transmitting the CCEs 410 of FIG. 4 and/or transmitting the CCEs 510 of FIG. 5. That is, one or more of the CCEs 410, 510 described above in reference to FIGS. 4 and 5 may carry the first PDCCH 670 and the second PDCCH 672.

In other aspects, the UE 104 may be configured to transmit the HARQ-ACK response 676 according to the second PDCCH 672 (e.g., using the override resources) if or when the second PDCCH 672 was transmitted at least N symbols 674 prior to the scheduled transmission of the HARQ-ACK response 676, wherein N is a value greater than zero. That is, if or when the second PDCCH 672 is transmitted less than N symbols 674 prior to the scheduled transmission of the HARQ-ACK response 676, then the UE 104 may transmit the HARQ-ACK response 676 according to the initial resource allocation indicated by the first PDCCH 670. Alternatively or additionally, if or when the second PDCCH 672 is transmitted at least N symbols 674 prior to the scheduled transmission of the HARQ-ACK response 676, then the UE 104 may transmit the HARQ-ACK response 676 according to the resource allocation indicated by the second PDCCH 672.

In some aspects, the value of N may be selected according to an advanced processing capability configuration of the UE 104 and/or a numerology configuration of the serving cell (e.g., SCS, symbol length/duration). For example, if or when the advanced processing time capability is enabled for PDSCH (e.g., processingType2Enabled of PDSCH-ServingCellConfig is set to enable) for the serving cell with the first PDCCH 670 and the second PDCCH 672, then N may be set to 3 for $\mu=0$, N may be set to 4.5 for $\mu=1$, and/or N may be set to 9 for $\mu=2$. $\mu$ may correspond to the smallest SCS configuration between the SCS configuration of the first PDCCH 670 and the second PDCCH 672 and the SCS configuration of the PUCCH carrying the HARQ-ACK information 674. Alternatively or additionally, if or when the advanced processing capability is disabled (e.g., processingType2Enabled of PDSCH-ServingCellConfig is set to disable), then N may be set to 8 for $\mu=0$, N may be set to 10 for $\mu=1$, and/or N may be set to 17 for $\mu=2$.

It may be understood that the mappings between N values and numerology described above are only one set of examples that may be utilized without departing from the scope described herein. For example, other mappings with different N values and/or different numerology configurations may be utilized.

FIG. 7A illustrates a diagram 700 of PDCCH DMRS bundling across PDCCH repetitions. The DMRS bundling example depicted in FIG. 7A may be implemented by a wireless communication system, such as the wireless communication system 100 of FIG. 1. In some aspects, the base station 102 may comprise a DMRS bundling component 188 (shown in FIG. 1) and the UE 104 may comprise a JCE component 198 (shown in FIG. 1).

The base station 102 may be configured to transmit, to the UE 104, two or more PDCCH repetitions. That is, the base station 102 may transmit, via the PDCCH, a same CCE multiple times to the UE 104. For example, CCEs 710A-710N (hereinafter "710") may comprise a same DMRS and/or a same control information (e.g., DCI).

Alternatively or additionally, the PDCCH repetitions may be within a same slot and/or the PDCCH repetitions may span across multiple slots. That is, the CCEs 710 may be transmitted within a same slot and/or may be transmitted across multiple slots.

As shown in FIG. 7A, the base station 102 may transmit the PDCCH repetitions (e.g., CCEs 710) according to a slot aggregation factor 715. For example, the base station 102 may transmit control information (e.g., DCI) to the UE 104 indicating a value (e.g., pdcch-AggregationFactor) corresponding to the number of PDCCH repetitions to be transmitted by the base station 102.

In some aspects, the base station 102 may transmit at least one PDCCH 710 comprising a HARQ-ACK request without a corresponding PDSCH grant, as described above in reference to FIGS. 5 and 6A-6D. For example, the base station 102 may transmit, via the PDCCH to the UE 104, a DCI requesting a HARQ-ACK transmission without a corresponding allocation and/or scheduling of PDSCH resources for transmitting the HARQ-ACK response 720. The UE 104 may transmit, in response to the request, a HARQ-ACK/NACK response 720 based on results of decoding the PDCCH transmissions.

In other aspects, the UE 104 may be configured to perform JCE on the DMRS bundled by the PDCCH repetitions (e.g., CCEs 710). That is, the UE 104 may perform channel estimation using the DMRS comprised by the CCEs 510. For example, the base station 102 may transmit, to the UE 104 configuration information (e.g., DCI, radio resource control (RRC)) indicating that PDCCH JCE is enabled for the CCEs 710. As such, the UE 104 may perform the JCE using the DMRS bundled by the CCEs 710, in response to receiving the configuration information. For example, the UE 104 may perform the JCE using a time-domain DMRS bundling window that comprises at least a portion of the CCEs 710. In some aspects, the HARQ-ACK/NACK response 720 may comprise one or more indications corresponding to results of the JCE.

As shown in FIG. 7A, the UE 104 may transmit the HARQ-ACK response 720 at a timing offset T 725 if or when the CCEs 710 comprise a HARQ-ACK request without a corresponding PDSCH grant. That is, the UE 104 may transmit the HARQ-ACK response after a number of symbols, corresponding to the timing offset T 725, have elapsed in relation to the CCEs 710. The timing offset T 725 may comprise a sum of a base offset N and an additional offset K. The UE 104 may identify the base offset N according to the HARQ-ACK request type carried by the CCEs 710, as described above in reference to FIGS. 6A-6D. That is, the UE 104 may identify the base offset N at least according to the type of HARQ-ACK request, the advanced UE processing capability configured for the UE 104, and a numerology of the serving cell.

However, in some aspects, the base offset N may not account for performing the JCE. That is, the base offset N may not provide sufficient time for the UE 104 to transmit the HARQ-ACK after completion of performing the JCE. As such, the timing offset T 725 may comprise an additional offset K (e.g., K=0, 1, 2, or 3) to account for the additional processing time needed due to the JCE.

In some aspects, the UE 104 may select the additional offset K according to an advanced processing time capability of the UE 104. For example, the UE 104 may select a non-zero value for the additional offset K if or when the advanced processing time capability is enabled (e.g., UE processing capability 2). Alternatively or additionally, the UE 104 may select a zero value for the additional offset K if or when the advanced processing time capability is disabled (e.g., UE processing capability 1).

In other aspects, the additional offset K may be a constant value that may be predefined by one or more regulations and/or standards (e.g., 3GPP standards). That is, selecting the additional offset K may comprise selecting a default offset value according to a predetermined rule. Alternatively or additionally, the UE 104 may report to the base station 102 a maximum value of the additional offset K supported by the UE 104. For example, the UE 104 may report a maximum value corresponding to all supported SCS configurations and/or may report a distinct maximum value for each supported SCS configuration. That is, the additional offset K may vary according to the SCS configuration.

The timing offset T 725 may be determined at least in part based on the request type transmitted by the base station 102. However, in some aspects, the timing offset T 725 may not account for a processing time by the UE 104 of the PDCCH and the PDSCH transmissions. For example, a processing timeline of the PDCCH transmissions may be impacted by the JCE performed by the UE 104 on the DMRS carried by the PDCCH transmissions. Alternatively or additionally, the processing time may be affected by a processing capability of the UE 104. That is, if or when the UE 104 has a reduced processing capability (e.g., UE processing capability of 2), the UE 104 may require additional processing time when compared with another UE 104 having a more advanced UE processing capability.

In some aspects, the UE 104 may be configured to transmit the HARQ-ACK response 720, if or when JCE is enabled for CCEs 710 (e.g., PDCCH repetitions) comprising at least one DCI requesting HARQ-ACK transmission without a corresponding PDSCH grant. For example, the HARQ-ACK transmission may be in response to detecting a DCI indicating SCell dormancy and occur after T1 symbols from the last symbol of a PDCCH t providing the DCI (as described in FIG. 6C). In another example, the HARQ-ACK transmission may be in response to a SPS PDSCH release and occur after T2 symbols from the last symbol of a PDCCH t providing the SPS PDSCH release (as described in FIG. 6A). In another example, the HARQ-ACK transmission may be in response to detecting a request for the Type-3 HARQ-ACK codebook and occur after T3 symbols from the last symbol of a PDCCH t providing the DCI (as described in FIG. 6B).

Alternatively or additionally, the UE 104 may not override HARQ-ACK information corresponding to a second DCI if or when the PDCCH t comprising the second DCI is not earlier than T4 symbols from the beginning of the first symbol of the first resource for PUCCH transmission in the slot (as described in FIG. 6D). For example, the UE 104 may be configured to start monitoring, T4 symbols from the beginning of the first symbol of the first resource for the PUCCH transmission in the slot, for a second DCI indicating a second resource for a second PUCCH transmission in the slot, the second resource being different from the first resource. The UE 104 may be further configured to transmit, in response to failing to detect the second DCI using the monitoring, the HARQ-ACK according to the first DCI.

In some aspects, the PDCCH t may correspond to the last PDCCH of the time-domain DMRS bundling window. The time-domain DMRS bundling window may comprise at least a portion of the PDCCH repetitions (e.g., CCEs 710). In other aspects, the PDCCH t may correspond to the first PDCCH of the time-domain DMRS bundling window. Alternatively or additionally, the PDCCH t may correspond to a specifically-configured PDCCH of the time-domain DMRS bundling window.

FIG. 7B illustrates a diagram 750 of PDCCH DMRS bundling across PDCCH monitoring occasions (PMOs). The DMRS bundling example depicted in FIG. 7B may be implemented by a wireless communication system, such as the wireless communication system 100 of FIG. 1. In some aspects, the base station 102 may comprise a DMRS bundling component 188 (shown in FIG. 1) and the UE 104 may comprise a JCE component 198 (shown in FIG. 1).

The base station 102 may be configured to transmit, to the UE 104, two or more PDCCH transmissions during respective PMOs 760A-760N (hereinafter "760"). That is, the base station 102 may transmit, via the PDCCH, one or more CCEs across the PMOs 760, as described in reference to FIG. 4.

In some aspects, the base station 102 may transmit at least one CCE comprising a HARQ-ACK request without a corresponding PDSCH grant, as described above in reference to FIGS. 4 and 6A-6D. For example, the base station 102 may transmit, via the PDCCH to the UE 104, a DCI requesting a HARQ-ACK transmission without a corresponding allocation and/or scheduling of PDSCH resources for transmitting the HARQ-ACK response 770. The UE 104 may transmit, in response to the request, a HARQ-ACK/NACK response 770 based on results of decoding the PDCCH transmissions.

In other aspects, the UE 104 may be configured to perform JCE on the DMRS bundled by the PMOs 760. That is, the UE 104 may perform channel estimation using the DMRS comprised by the CCEs transmitted during the PMOs 760. For example, the base station 102 may transmit, to the UE 104 configuration information (e.g., DCI, radio resource control (RRC)) indicating that PDCCH JCE is enabled for the PMOs 760. As such, the UE 104 may perform the JCE using the DMRS bundled by the CCEs, in response to receiving the configuration information. For example, the UE 104 may perform the JCE using a time-domain DMRS bundling window 765 that comprises at least a portion of the PMOs 760. In some aspects, the HARQ-ACK/NACK response 770 may comprise one or more indications corresponding to results of the JCE.

As shown in FIG. 7B, the UE 104 may transmit the HARQ-ACK response 770 at a timing offset T 775 if or when the PMOs 760 comprise a HARQ-ACK request without a corresponding PDSCH grant. That is, the UE 104 may transmit the HARQ-ACK response 770 after a number of symbols, corresponding to the timing offset T 775, have elapsed in relation to the PMOs 760. The timing offset T 775 may comprise a sum of a base offset N and an additional offset K. The UE 104 may identify the base offset N according to the HARQ-ACK request type carried by the PMOs 760, as described above in reference to FIGS. 6A-6D. That is, the UE 104 may identify the base offset N at least according to the type of HARQ-ACK request, the advanced UE processing capability configured for the UE 104, and a numerology of the serving cell.

However, in some aspects, the base offset N may not account for performing the JCE. That is, the base offset N may not provide sufficient time for the UE 104 to transmit the HARQ-ACK after completion of performing the JCE. As such, the timing offset T 775 may comprise an additional offset K (e.g., K=0, 1, 2, or 3) to account for the additional processing time needed due to the JCE.

In some aspects, the UE 104 may select the additional offset K according to an advanced processing time capability of the UE 104. For example, the UE 104 may select a non-zero value for the additional offset K if or when the advanced processing time capability is enabled (e.g., UE processing capability 2). Alternatively or additionally, the UE 104 may select a zero value for the additional offset K if or when the advanced processing time capability is disabled (e.g., UE processing capability 1).

In other aspects, the additional offset K may be a constant value that may be predefined by one or more regulations and/or standards (e.g., 3GPP standards). That is, selecting the additional offset K may comprise selecting a default offset value according to a predetermined rule. Alternatively or additionally, the UE 104 may report to the base station 102 a maximum value of the additional offset K supported by the UE 104. For example, the UE 104 may report a maximum value corresponding to all supported SCS configurations and/or may report a distinct maximum value for each supported SCS configuration. That is, the additional offset K may vary according to the SCS configuration.

The timing offset T 775 may be determined at least in part based on the request type transmitted by the base station 102. However, in some aspects, the timing offset T 725 may not account for a processing time by the UE 104 of the PDCCH and the PDSCH transmissions. For example, a processing timeline of the PDCCH transmissions may be impacted by the JCE performed by the UE 104 on the DMRS carried by the PDCCH transmissions. Alternatively or additionally, the processing time may be affected by a processing capability of the UE 104. That is, if or when the UE 104 has a reduced processing capability (e.g., UE processing capability of 2), the UE 104 may require additional processing time when compared with another UE 104 having a more advanced UE processing capability.

In some aspects, the UE 104 may be configured to transmit the HARQ-ACK response 770, if or when JCE is enabled for PMOs 760 comprising at least one DCI requesting HARQ-ACK transmission without a corresponding PDSCH grant. For example, the HARQ-ACK transmission 770 may be in response to detecting a DCI indicating SCell dormancy (as described in FIG. 6C) and occur after T1 symbols from the last symbol of the last PDCCH transmitted during the PMOs 760 (e.g., PMO N 760N), or from the last symbol of the PDCCH providing the DCI, or from the last symbol of a specifically-configured PDCCH of the time-domain DMRS bundling window 765.

In another example, the HARQ-ACK transmission 770 may be in response to detecting a DCI providing a SPS PDSCH release (as described in FIG. 6A) and occur after T2 symbols from the last symbol of the last PDCCH transmitted during the PMOs 760 (e.g., PMO N 760N), or from the last symbol of the PDCCH providing the SPS PDSCH release, or from the last symbol of a specifically-configured PDCCH of the time-domain DMRS bundling window 765.

In another example, the HARQ-ACK transmission 770 may be in response to detecting a request for the Type-3 HARQ-ACK codebook (as described in FIG. 6B) and occur after T3 symbols from the last symbol of the last PDCCH transmitted during the PMOs 760 (e.g., PMO N 760N), or from the last symbol of the PDCCH providing the Type-3 HARQ-ACK codebook request, or from the last symbol of a specifically-configured PDCCH of the time-domain DMRS bundling window 765.

Figure 8:
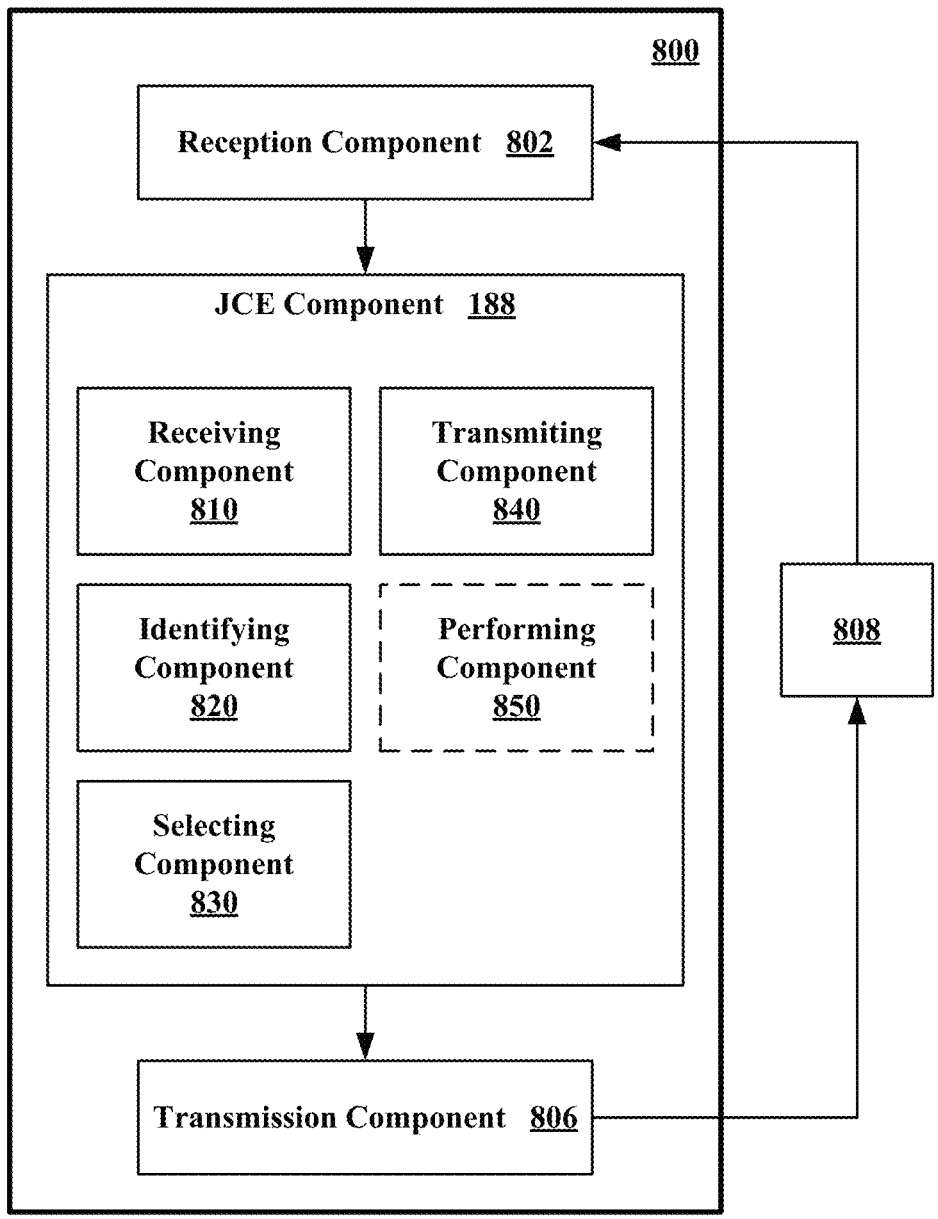
FIG. 8 is a diagram illustrating an example apparatus, such as a user equipment (UE), for wireless communication in a wireless communication network, in accordance with various aspects of the present disclosure.

FIG. 8 is a block diagram of an example apparatus 800 for wireless communication by a UE of a wireless communication network. The apparatus 800 may be a UE 104 (e.g., UE 104 of FIGS. 1, 3-5, 6A-6D, and 7A-7B) or a UE 104 may include the apparatus 800. In some aspects, the apparatus 800 may include a set of components such as, a reception component 802 configured to receive wireless communications from another apparatus (e.g., such as apparatus 808), a JCE component 198 configured to perform JCE on a plurality of PDCCH transmissions, and a transmission component 806 to transmit wireless communications to another apparatus (e.g., apparatus 808). The components of the set of components may be in communication with one another (e.g., via buses or electrical connections). As shown, the apparatus 800 may be in communication with another apparatus 808 (such as a base station 102, or another wireless communication device) using the reception component 802 and the transmission component 806.

In some aspects, the apparatus 800 may be configured to perform one or more operations described herein in connection with FIGS. 1, 3-5, 6A-6D, and 7A-7B. Alternatively or additionally, the apparatus 800 may be configured to perform one or more processes described herein, such as method 900 of FIGS. 9-11. In some aspects, the apparatus 800 may include one or more components of the UE 104 described above in connection with FIGS. 1, 3-5, 6A-6D, and 7A-7B.

The reception component 802 may receive communications, such as reference signals, control information, data communications, or a combination thereof, from the apparatus 808. The reception component 802 may provide received communications to one or more other components of the apparatus 800, such as the JCE component 198. In some aspects, the reception component 802 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the UE 104 described above in connection with FIGS. 1, 3-5, 6A-6D, and 7A-7B.

The transmission component 806 may transmit communications, such as reference signals, control information, data communications, or a combination thereof, to the apparatus 808. In some aspects, the JCE component 198 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In other aspects, the transmission component 806 may include one or more antennas, a modulator, a transmit MIMO processor, a transmit processor, a controller/processor, a memory, or a combination thereof, of the UE 104 described above in connection with FIGS. 1, 3-5, 6A-6D, and 7A-7B. In some aspects, the transmission component 806 may be co-located with the reception component 802 in a transceiver or transceiver component.

The JCE component 198 may be configured to perform JCE on a plurality of PDCCH transmissions. In some aspects, the JCE component 198 may include a set of components, such as a receiving component 810, an identifying component 820, a selecting component 830, and a transmitting component 840. The receiving component 810 may be configured to receive, from the apparatus 808, configuration information and/or the plurality of PDCCH transmissions. The identifying component 820 may be configured to identify a base offset. The selecting component 830 may be configured to select an additional offset. The transmitting component 840 may be configured to transmit, at a timing offset, a HARQ-ACK response.

In other optional or additional aspects, the JCE component 198 may include a performing component 850 that may be configured to perform channel estimation.

Alternatively or additionally, the set of components may be separate and distinct from the JCE component 198. In other aspects, one or more components of the set of components may include or may be implemented within a controller/processor (e.g., the TX processor 356, the RX processor 353, the controller/processor 355), a memory (e.g., the memory 357), or a combination thereof, of the UE 104 described in FIGS. 1, 3-5, 6A-6D, and 7A-7B. Alternatively or additionally, one or more components of the set of components may be implemented at least in part as software stored in a memory, such as the memory 357. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIGS. 1, 3-5, 6A-6D, and 7A-7B.

Referring to FIGS. 8-11, in operation, an apparatus 800 may perform a method 900 of wireless communication at a UE 104. Alternatively or additionally, the method 900 may be performed by the UE 104 (which may include the memory 357 and which may be the entire UE 104 and/or one or more components of the UE 104 such as the JCE component 198, the TX processor 356, the RX processor 353, and/or the controller/processor 355). The method 900 may be performed by the JCE component 198 in communication with the apparatus 808 (e.g., base station 102).

Figure 9:
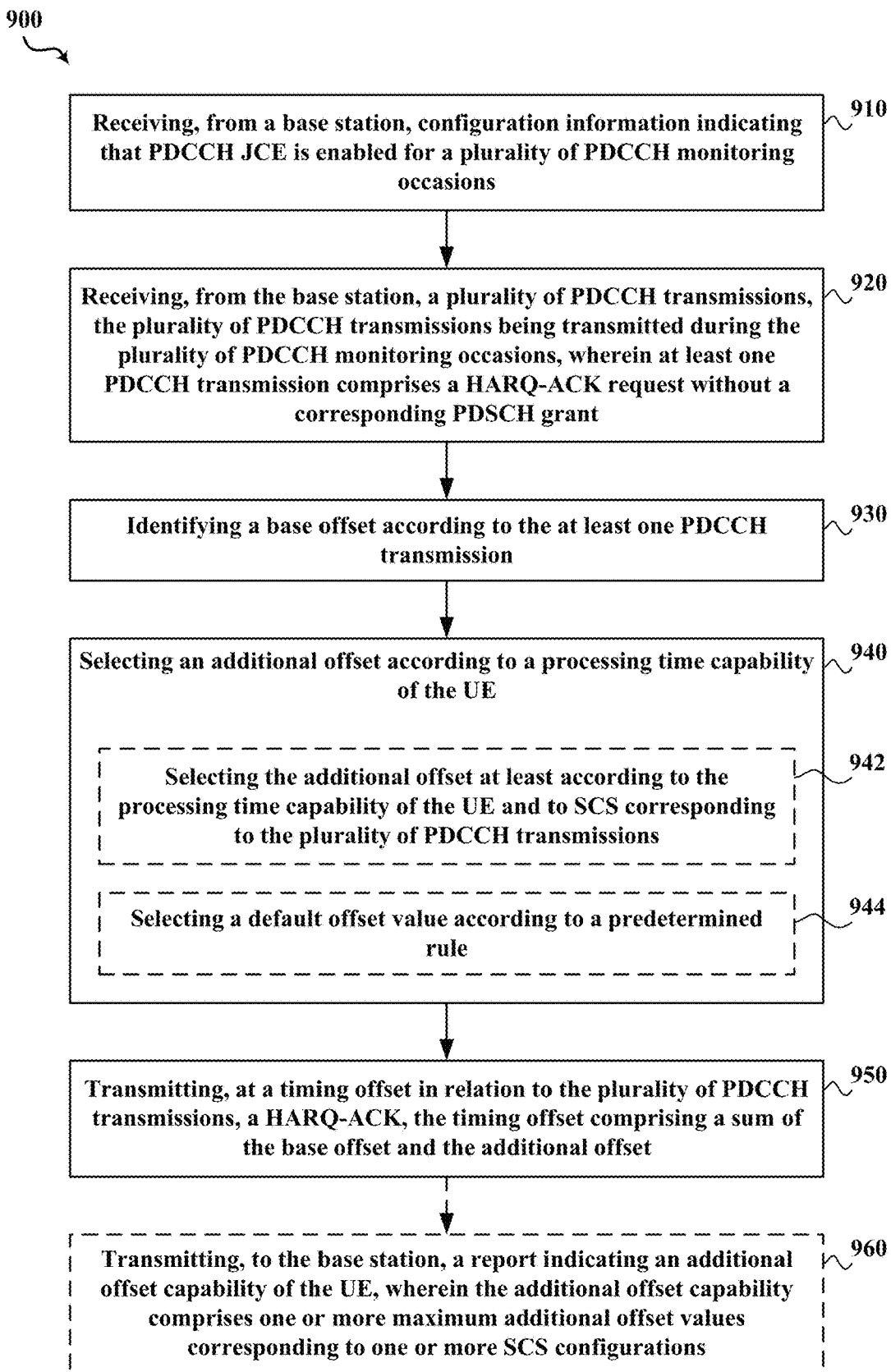
FIG. 9 is a flowchart of a method of wireless communication by a UE of a wireless communication network, in accordance with various aspects of the present disclosure.

At block 910 of FIG. 9, the method 900 includes receiving, from a base station, configuration information indicating that PDCCH JCE is enabled for a plurality of PDCCH monitoring occasions. For example, in an aspect, the UE 104, the JCE component 198, and/or the receiving component 810 may be configured to or may comprise means for receiving, from a base station 102, configuration information indicating that PDCCH JCE is enabled for a plurality of PDCCH monitoring occasions.

For example, the receiving at block 910 may include receiving, from the base station 102, the configuration information (e.g., DCI, RRC) indicating that PDCCH JCE is enabled, as described above in reference to FIGS. 7A-7B.

Further, for example, the receiving at block 910 may be performed to configure the UE 104 to perform JCE on the plurality of PDCCH transmissions comprising DMRS bundles. Thus, aspects presented herein may potentially improve the accuracy of the channel estimation, and, consequently may enhance PDCCH coverage and/or performance.

At block 920 of FIG. 9, the method 900 includes receiving, from the base station, a plurality of PDCCH transmissions, the plurality of PDCCH transmissions being transmitted during the plurality of PDCCH monitoring occasions, wherein at least one PDCCH transmission comprises a HARQ-ACK request without a corresponding PDSCH grant. For example, in an aspect, the UE 104, the JCE component 198, and/or the receiving component 810 may be configured to or may comprise means for receiving, from the base station 102, a plurality of PDCCH transmissions, the plurality of PDCCH transmissions being transmitted during the plurality of PDCCH monitoring occasions, wherein at least one PDCCH transmission comprises a HARQ-ACK request without a corresponding PDSCH grant.

For example, the receiving at block 920 may include receiving the plurality of PDCCH transmissions, as described above in reference to FIGS. 3-5, 6A-6D, and 7A-7B.

In some aspects, the receiving at block 920 may include receiving the plurality of PDCCH transmission repetitions according to a slot aggregation factor (e.g., pdcch-AggregationFactor), as described above in reference to FIG. 7A.

In other optional or additional aspects, the receiving at block 920 may include receiving the plurality of PDCCH transmission repetitions within a time-domain DMRS bundling window 765, as described above in reference to FIG. 7B.

In other optional or additional aspects, the at least one PDCCH transmission may comprise at least one of a SPS PDSCH release, a Type-3 HARQ-ACK codebook request, a SCell dormancy indication, or a DCI overriding a current PUCCH resource allocation for transmission of the HARQ-ACK, wherein a time difference between a receive time of the at least one PDCCH transmission comprising the DCI and a scheduled transmission time of the current PUCCH resource allocation exceeds a minimum time offset.

Further, for example, the receiving at block 920 may be performed to obtain the PDCCH DMRS bundles with which to perform the channel estimation using JCE. Thus, aspects presented herein may potentially improve the accuracy of the channel estimation, and, consequently may enhance PDCCH coverage and/or performance.

At block 930 of FIG. 9, the method 900 includes identifying a base offset according to the at least one PDCCH transmission. For example, in an aspect, the UE 104, the JCE component 198, and/or the identifying component 820 may be configured to or may comprise means for identifying a base offset according to the at least one PDCCH transmission.

For example, the identifying at block 930 may include identifying the base offset at least according to the type of HARQ-ACK request comprised by the at least one PDCCH transmission, the advanced UE processing capability configured for the UE 104, and a numerology of the serving cell, as described above in reference to FIGS. 6A-6D and 7A-7B.

Further, for example, the identifying at block 930 may be performed to identify a timing offset for transmitting the HARQ-ACK in response to the HARQ-ACK request comprised by the at least one PDCCH transmission.

At block 940 of FIG. 9, the method 900 includes selecting an additional offset according to a processing time capability of the UE. For example, in an aspect, the UE 104, the JCE component 198, and/or the selecting component 830 may be configured to or may comprise means for selecting an additional offset according to a processing time capability of the UE 104.

For example, the selecting at block 940 may include selecting an additional offset to account for the processing time needed to perform the JCE, as described above in reference to FIGS. 7A-7B.

Further, for example, the selecting at block 940 may be performed to select a timing offset for transmitting the HARQ-ACK in response to the HARQ-ACK request comprised by the at least one PDCCH transmission.

In other optional or additional aspects, the selecting at block 940 may include, at sub-block 942, selecting the additional offset at least according to the processing time capability of the UE and to SCS corresponding to the plurality of PDCCH transmissions.

In other optional or additional aspects, the selecting at block 940 may include, at sub-block 944, selecting a default offset value according to a predetermined rule. For example, the selecting may include selecting a constant value that may be predefined by one or more regulations and/or standards (e.g., 3GPP standards).

At block 950 of FIG. 9, the method 900 includes transmitting, at a timing offset in relation to the plurality of PDCCH transmissions, a HARQ-ACK, the timing offset comprising a sum of the base offset and the additional offset. For example, in an aspect, the UE 104, the JCE component 198, and/or the transmitting component 840 may be configured to or may comprise means for transmitting, at a timing offset in relation to the plurality of PDCCH transmissions, a HARQ-ACK, the timing offset comprising a sum of the base offset and the additional offset.

For example, the transmitting at block 950 may include transmitting the HARQ-ACK response, as described above in reference to FIGS. 6A-6D and 7A-7B.

In some aspects, the transmitting at block 950 may include transmitting the HARQ-ACK a number of symbols after transmission of a last symbol of the at least one PDCCH transmission, wherein the number of symbols corresponds to the timing offset, and wherein the at least one PDCCH transmission is a last PDCCH of a time-domain DMRS bundling window, a first PDCCH of the time-domain DMRS bundling window, or a specifically-configured PDCCH of the time-domain DMRS bundling window.

In other optional or additional aspects, the transmitting at block 950 may include transmitting, in response to detection of a DCI indicating a SCell dormancy, the HARQ-ACK after T1 symbols from a last symbol of a first PDCCH providing the DCI.

In other optional or additional aspects, the transmitting at block 950 may include transmitting, in response to a SPS PDSCH release, the HARQ-ACK after T2 symbols from a last symbol of a second PDCCH providing the SPS PDSCH release.

In other optional or additional aspects, the transmitting at block 950 may include transmitting, in response to a request for a Type-3 HARQ-ACK codebook, the HARQ-ACK after T3 symbols from a last symbol of a third PDCCH providing the request.

In other optional or additional aspects, the transmitting at block 950 may include receiving a first DCI indicating a first resource for a first PUCCH transmission in a slot. In such optional or additional aspects, the transmitting at block 950 may further include start monitoring, T4 symbols from a beginning of a first symbol of the first resource for the PUCCH transmission in the slot, for a second DCI indicating a second resource for a second PUCCH transmission in the slot, the second resource being different from the first resource. Additionally, in such optional or additional aspects, the transmitting at block 950 may further include transmitting, in response to failing to detect the second DCI using the monitoring, the HARQ-ACK according to the first DCI.

In other optional or additional aspects, the transmitting at block 950 may include transmitting the HARQ-ACK a number of symbols after transmission of a last symbol of a particular PDCCH transmission of the plurality of PDCCH transmissions, wherein the number of symbols corresponds to the timing offset, and wherein the particular PDCCH transmission is a last PDCCH transmission of the plurality of PDCCH transmissions, the at least one PDCCH transmission, or a specially-configured PDCCH in the time-domain DMRS bundling window.

Further, for example, the transmitting at block 950 may be performed to transmit, at a timing offset that accounts for processing time of the JCE, the HARQ-ACK in response to the HARQ-ACK request without a corresponding PDSCH grant that is comprised by the at least one PDCCH transmission. Thus, aspects presented herein may potentially improve the accuracy of the channel estimation, and, consequently may enhance PDCCH coverage and/or performance.

In an optional or additional aspect that may be combined with any other aspect, at block 960 of FIG. 9, the method 900 may include transmitting, to the base station, a report indicating an additional offset capability of the UE, wherein the additional offset capability comprises one or more maximum additional offset values corresponding to one or more SCS configurations. For example, in an aspect, the UE 104, the JCE component 198, and/or the transmitting component 840 may be configured to or may comprise means for transmitting, to the base station 102, a report indicating an additional offset capability of the UE 104, wherein the additional offset capability comprises one or more maximum additional offset values corresponding to one or more SCS configurations.

For example, the transmitting at block 960 may include reporting to the base station 102 a maximum value of the additional offset K supported by the UE 104, as described above in reference to FIGS. 7A-7B.

Further, for example, the transmitting at block 960 may be performed to indicate to the base station 102 the timing offset capabilities of the UE 104.

Figure 10:
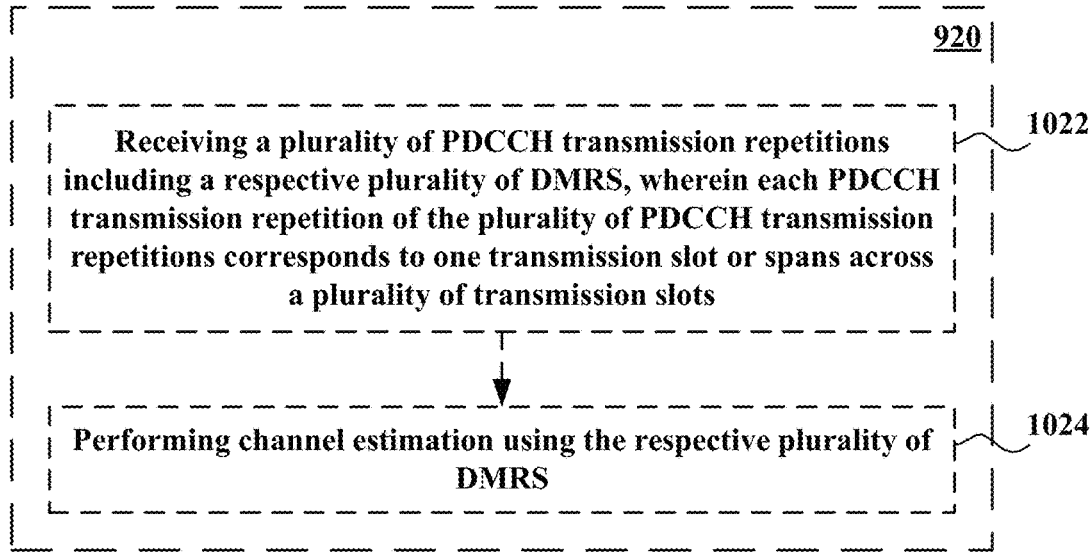
FIG. 10 is a flowchart of first additional or optional steps for the method of wireless communication by a UE of a wireless communication network, in accordance with various aspects of the present disclosure.

Referring to FIG. 10, in an optional or additional aspect that may be combined with any other aspect, at block 1022, the receiving, at block 920 of method 900 of FIG. 9, of the plurality of PDCCH transmissions being transmitted during the plurality of PDCCH monitoring occasions may include receiving a plurality of PDCCH transmission repetitions including a respective plurality of DMRS, wherein each PDCCH transmission repetition of the plurality of PDCCH transmission repetitions corresponds to one transmission slot or spans across a plurality of transmission slots. For example, in an aspect, the UE 104, the JCE component 198, and/or the receiving component 810 may be configured to or may comprise means for receiving a plurality of PDCCH transmission repetitions including a respective plurality of DMRS, wherein each PDCCH transmission repetition of the plurality of PDCCH transmission repetitions corresponds to one transmission slot or spans across a plurality of transmission slots.

For example, the receiving at block 1022 may include receiving the plurality of PDCCH transmission repetitions, as described above in reference to FIGS. 5 and 7A.

Further, for example, the receiving at block 1022 may be performed to obtain the PDCCH DMRS bundles with which to perform the channel estimation using JCE. Thus, aspects presented herein may potentially improve the accuracy of the channel estimation, and, consequently may enhance PDCCH coverage and/or performance.

In an optional or additional aspect that may be combined with any other aspect, at block 1024, the receiving, at block 920 of method 900 of FIG. 9, of the plurality of PDCCH transmissions being transmitted during the plurality of PDCCH monitoring occasions may include performing channel estimation using the respective plurality of DMRS. For example, in an aspect, the UE 104, the JCE component 198, and/or the performing component 850 may be configured to or may comprise means for performing channel estimation using the respective plurality of DMRS.

For example, the performing at block 1024 may include performing JCE on the DMRS bundled by the PDCCH repetitions 710, as described above in reference to FIG. 7A.

Further, for example, the performing at block 1024 may be performed to potentially improve the accuracy of the channel estimation, and, consequently may enhance PDCCH coverage and/or performance.

Figure 11:
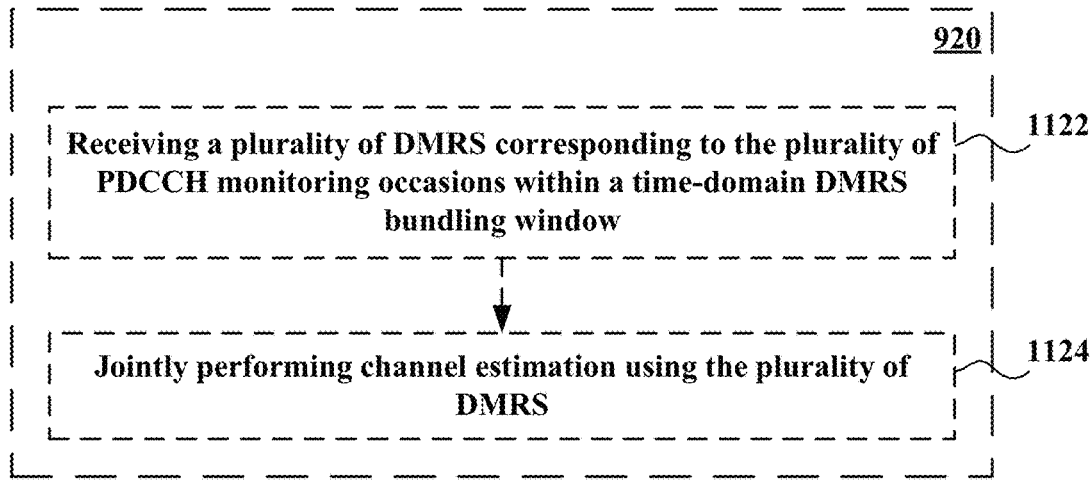
FIG. 11 is a flowchart of second additional or optional steps for the method of wireless communication by a UE of a wireless communication network, in accordance with various aspects of the present disclosure.

Referring to FIG. 11, in an optional or additional aspect that may be combined with any other aspect, at block 1122, the receiving, at block 920 of method 900 of FIG. 9, of the plurality of PDCCH transmissions being transmitted during the plurality of PDCCH monitoring occasions may include receiving a plurality of DMRS corresponding to the plurality of PDCCH monitoring occasions within a time-domain DMRS bundling window. For example, in an aspect, the UE 104, the JCE component 198, and/or the receiving component 810 may be configured to or may comprise means for receiving a plurality of DMRS corresponding to the plurality of PDCCH monitoring occasions within a time-domain DMRS bundling window.

For example, the receiving at block 1122 may include receiving the plurality of DMRS corresponding to the plurality of PDCCH monitoring occasions, as described above in reference to FIGS. 4 and 7B.

Further, for example, the receiving at block 1122 may be performed to obtain the PDCCH DMRS bundles with which to perform the channel estimation using JCE. Thus, aspects presented herein may potentially improve the accuracy of the channel estimation, and, consequently may enhance PDCCH coverage and/or performance.

In an optional or additional aspect that may be combined with any other aspect, at block 1124, the receiving, at block 920 of method 900 of FIG. 9, of the plurality of PDCCH transmissions being transmitted during the plurality of PDCCH monitoring occasions may include jointly performing channel estimation using the plurality of DMRS. For example, in an aspect, the UE 104, the JCE component 198, and/or the performing component 850 may be configured to or may comprise means for jointly performing channel estimation using the plurality of DMRS.

For example, the performing at block 1124 may include performing JCE on the DMRS bundled by the PMOs 760, as described above in reference to FIG. 7B.

Further, for example, the performing at block 1124 may be performed to potentially improve the accuracy of the channel estimation, and, consequently may enhance PDCCH coverage and/or performance.

Figure 12:
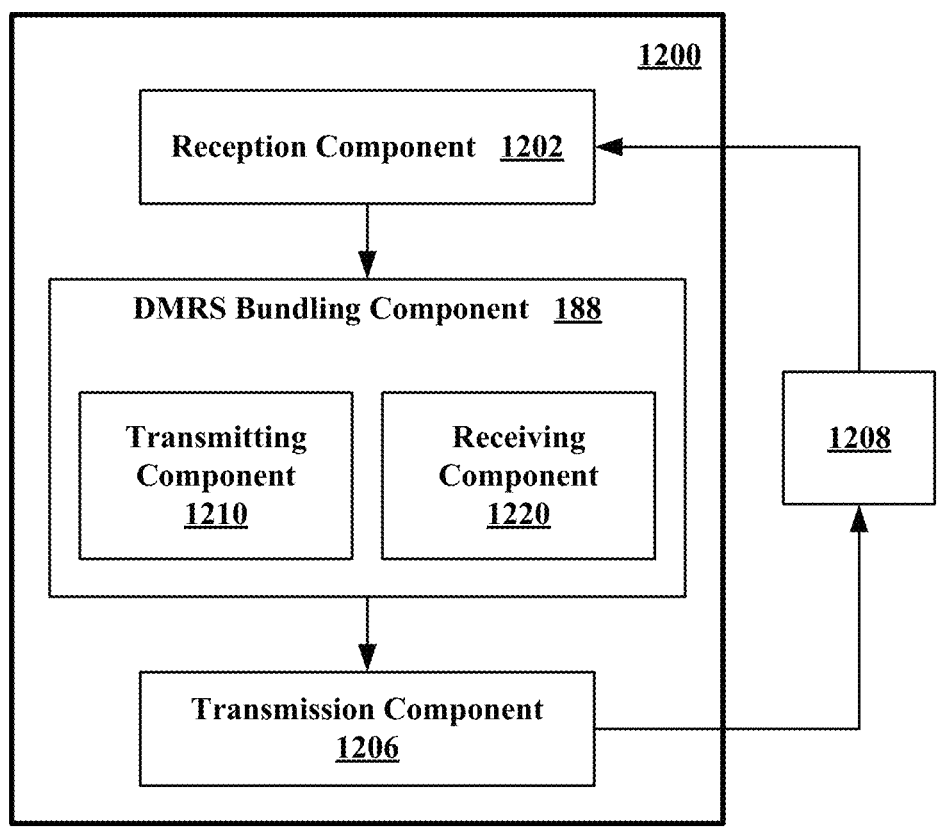
FIG. 12 is a diagram illustrating an example apparatus, such as a base station, for wireless communication in a wireless communication network, in accordance with various aspects of the present disclosure.

FIG. 12 is a block diagram of an example apparatus 1200 for wireless communication by a base station of a wireless communication network. The apparatus 1200 may be a base station 102 (e.g., base station 102 of FIGS. 1, 3-5, 6A-6D, and 7A-7B) or a base station 102 may include the apparatus 1200. In some aspects, the apparatus 1200 may include a reception component 1202 configured to receive wireless communications from another apparatus (e.g., such as apparatus 1208), a DMRS bundling component 188 configured to transmit a plurality of PDCCH transmissions that may be used for JCE, a transmission component 1206 configured to transmit wireless communications to another apparatus (e.g., such as apparatus 1208), and which may be in communication with one another (e.g., via buses or electrical connections). As shown, the apparatus 1200 may be in communication with another apparatus 1208 (such as a UE 104, or another wireless communication device) using the reception component 1202 and the transmission component 1206.

In some aspects, the apparatus 1200 may be configured to perform one or more operations described herein in connection with FIGS. 1, 3-5, 6A-6D, and 7A-7B. Alternatively or additionally, the apparatus 1200 may be configured to perform one or more processes described herein, such as method 1300 of FIG. 13. In some aspects, the apparatus 1200 may include one or more components of the base station 102 described above in connection with FIGS. 1, 3-5, 6A-6D, and 7A-7B.

The reception component 1202 may receive communications, such as reference signals, control information, data communications, or a combination thereof, from the apparatus 1208. The reception component 1202 may provide received communications to one or more other components of the apparatus 1200, such as the DMRS bundling component 188. In some aspects, the reception component 1202 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the base station 102 described above in connection with FIGS. 1, 3-5, 6A-6D, and 7A-7B.

The transmission component 1206 may transmit communications, such as reference signals, control information, data communications, or a combination thereof, to the apparatus 1208. In some aspects, the DMRS bundling component 188 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In other aspects, the transmission component 1206 may include one or more antennas, a modulator, a transmit MIMO processor, a transmit processor, a controller/processor, a memory, or a combination thereof, of the base station 102 described above in connection with FIGS. 1, 3-5, 6A-6D, and 7A-7B. In some aspects, the transmission component 1206 may be co-located with the reception component 1202 in a transceiver or transceiver component.

The DMRS bundling component 188 may be configured to transmit a plurality of PDCCH transmissions that may be used for JCE. In some aspects, the DMRS bundling component 188 may include a set of components, such as a transmitting component 1210 and a receiving component 1220. The transmitting component 1210 may be configured to transmit configuration information and/or the plurality of PDCCH transmissions. The receiving component 1220 may be configured to receive a HARQ-ACK response.

Alternatively or additionally, the set of components may be separate and distinct from the DMRS bundling component 188. In other aspects, one or more components of the set of components may include or may be implemented within a controller/processor (e.g., the TX processor 316, the RX processor 313, the controller/processor 315), a memory (e.g., the memory 317), or a combination thereof, of the base station 102 described in FIGS. 1, 3-5, 6A-6D, and 7A-7B. Alternatively or additionally, one or more components of the set of components may be implemented at least in part as software stored in a memory, such as the memory 317. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIGS. 1, 3-5, 6A-6D, and 7A-7B.

Figure 13:
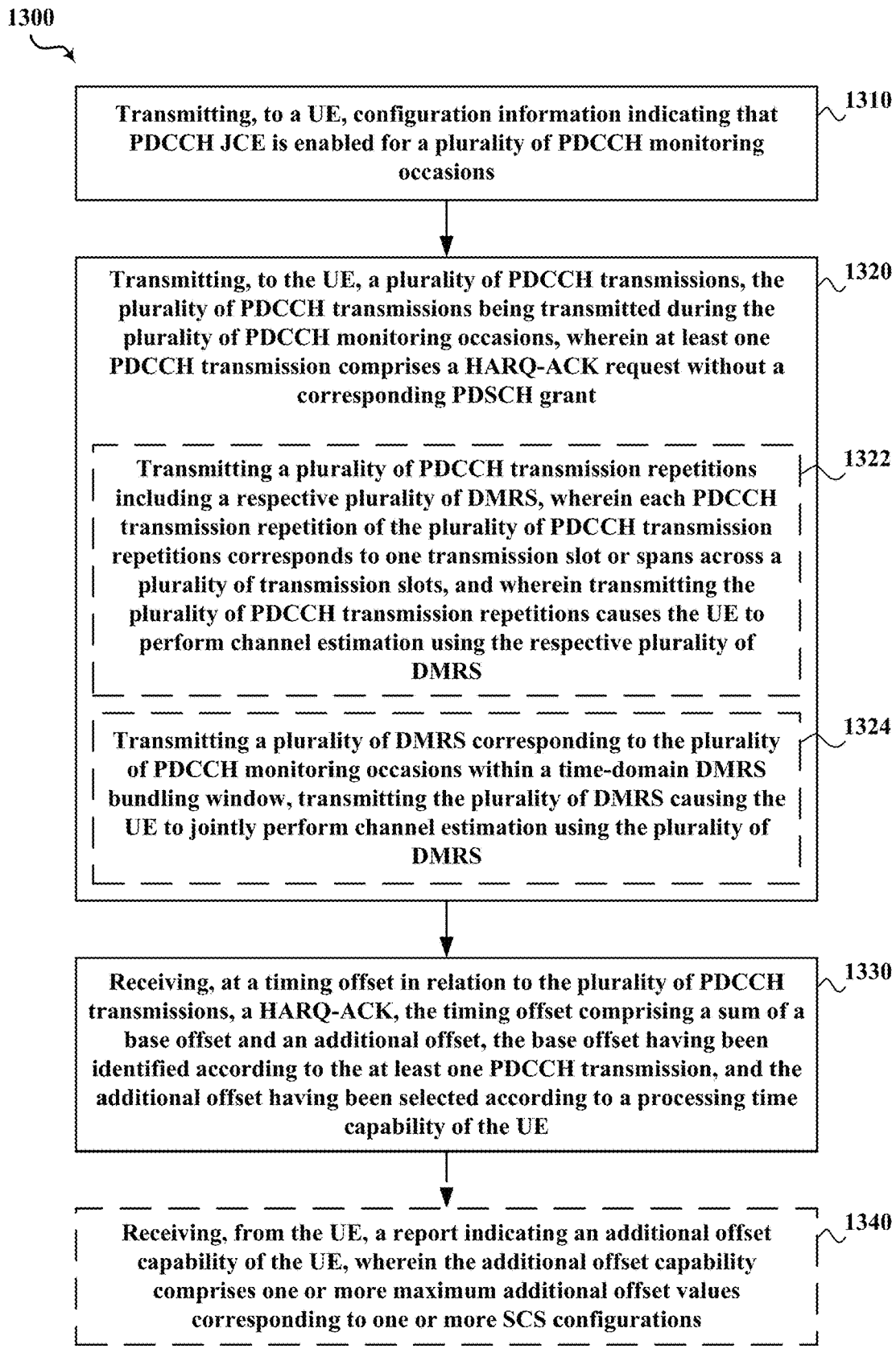
FIG. 13 is a flowchart of a method of wireless communication by a base station of a wireless communication network, in accordance with various aspects of the present disclosure.

Referring to FIGS. 12-13, in operation, an apparatus 1200 may perform a method 1300 of wireless communication at a network node. Alternatively or additionally, the method 1300 may be performed by the base station 102 (which may include the memory 317 and which may be the entire base station 102 and/or one or more components of the base station 102 such as the DMRS bundling component 188, the TX processor 316, the RX processor 313, and/or the controller/processor 315). The method 1300 may be performed by the DMRS bundling component 188 in communication with the apparatus 1208 (e.g., UE 104).

At block 1310 of FIG. 13, the method 1300 includes transmitting, to a UE, configuration information indicating that PDCCH JCE is enabled for a plurality of PDCCH monitoring occasions. For example, in an aspect, the base station 102, the DMRS bundling component 188, and/or the transmitting component 1210 may be configured to or may comprise means for transmitting, to a UE 104, configuration information indicating that PDCCH JCE is enabled for a plurality of PDCCH monitoring occasions.

For example, the transmitting at block 1310 may include transmitting, to the UE 104, the configuration information (e.g., DCI, RRC) indicating that PDCCH JCE is enabled, as described above in reference to FIGS. 7A-7B.

Further, for example, the transmitting at block 1310 may be performed to configure the UE 104 to perform JCE on the plurality of PDCCH transmissions comprising DMRS bundles. Thus, aspects presented herein may potentially improve the accuracy of the channel estimation, and, consequently may enhance PDCCH coverage and/or performance.

At block 1320 of FIG. 13, the method 1300 includes transmitting, to the UE, a plurality of PDCCH transmissions, the plurality of PDCCH transmissions being transmitted during the plurality of PDCCH monitoring occasions, wherein at least one PDCCH transmission comprises a HARQ-ACK request without a corresponding PDSCH grant. For example, in an aspect, the base station 102, the DMRS bundling component 188, and/or the transmitting component 1210 may be configured to or may comprise means for transmitting, to the UE 104, a plurality of PDCCH transmissions, the plurality of PDCCH transmissions being transmitted during the plurality of PDCCH monitoring occasions, wherein at least one PDCCH transmission comprises a HARQ-ACK request without a corresponding PDSCH grant.

For example, the transmitting at block 1320 may include transmitting the plurality of PDCCH transmissions, as described above in reference to FIGS. 3-5, 6A-6D, and 7A-7B.

In some aspects, the transmitting at block 1320 may include transmitting the plurality of PDCCH transmission repetitions according to a slot aggregation factor.

In other optional or additional aspects, the transmitting at block 1320 may include transmitting the plurality of PDCCH transmission repetitions within a time-domain DMRS bundling window.

In other optional or additional aspects, the at least one PDCCH transmission may comprise at least one of a SPS PDSCH release, a Type-3 HARQ-ACK codebook request, a SCell dormancy indication, or a DCI overriding a current PUCCH resource allocation for transmission of the HARQ-ACK, wherein a time difference between a receive time of the at least one PDCCH transmission comprising the DCI and a scheduled transmission time of the current PUCCH resource allocation exceeds a minimum time offset.

Further, for example, the performing at block 1320 may be performed to provide the PDCCH DMRS bundles with which the UE 104 is to perform the channel estimation using JCE. Thus, aspects presented herein may potentially improve the accuracy of the channel estimation, and, consequently may enhance PDCCH coverage and/or performance.

In other optional or additional aspects, the transmitting at block 1320 may include, at sub-block 1322, transmitting a plurality of PDCCH transmission repetitions including a respective plurality of DMRS, wherein each PDCCH transmission repetition of the plurality of PDCCH transmission repetitions corresponds to one transmission slot or spans across a plurality of transmission slots, and wherein transmitting the plurality of PDCCH transmission repetitions causes the UE to perform channel estimation using the respective plurality of DMRS.

In other optional or additional aspects, the transmitting at block 1320 may include, at sub-block 1324, transmitting a plurality of DMRS corresponding to the plurality of PDCCH monitoring occasions within a time-domain DMRS bundling window, transmitting the plurality of DMRS causing the UE to jointly perform channel estimation using the plurality of DMRS.

At block 1330 of FIG. 13, the method 1300 includes receiving, at a timing offset in relation to the plurality of PDCCH transmissions, a HARQ-ACK, the timing offset comprising a sum of a base offset and an additional offset, the base offset having been identified according to the at least one PDCCH transmission, and the additional offset having been selected according to a processing time capability of the UE. For example, in an aspect, the UE 104, the JCE component 198, and/or the receiving component 1220 may be configured to or may comprise means for receiving, at a timing offset in relation to the plurality of PDCCH transmissions, a HARQ-ACK, the timing offset comprising a sum of a base offset and an additional offset, the base offset having been identified according to the at least one PDCCH transmission, and the additional offset having been selected according to a processing time capability of the UE.

For example, the receiving at block 1330 may include receiving, from the UE 104, the HARQ-ACK response, as described above in reference to FIGS. 6A-6D and 7A-7B.

In some aspects, the receiving at block 1330 may include receiving the HARQ-ACK a number of symbols after transmission of a last symbol of the at least one PDCCH transmission, wherein the number of symbols corresponds to the timing offset, and wherein the at least one PDCCH transmission is a last PDCCH of a time-domain DMRS bundling window, a first PDCCH of the time-domain DMRS bundling window, or a specifically-configured PDCCH of the time-domain DMRS bundling window.

In other optional or additional aspects, the receiving at block 1330 may include receiving, in response to transmitting a DCI indicating a SCell dormancy, the HARQ-ACK after T1 symbols from a last symbol of a first PDCCH providing the DCI.

In other optional or additional aspects, the receiving at block 1330 may include receiving, in response to transmitting a SPS PDSCH release, the HARQ-ACK after T2 symbols from a last symbol of a second PDCCH providing the SPS PDSCH release.

In other optional or additional aspects, the receiving at block 1330 may include receiving, in response to transmitting a request for a Type-3 HARQ-ACK codebook, the HARQ-ACK after T3 symbols from a last symbol of a third PDCCH providing the request.

In other optional or additional aspects, the receiving at block 1330 may include transmitting a first DCI indicating a first resource for a first PUCCH transmission in a slot. In such optional or additional aspects, the receiving at block 1330 may further include preventing transmitting, less than T4 symbols from a beginning of a first symbol of the first resource for the PUCCH transmission in the slot, a second DCI indicating a second resource for a second PUCCH transmission in the slot, the second resource being different from the first resource. Additionally, in such optional or additional aspects, the receiving at block 1330 may further include receiving, in response to failing to transmit the second DCI, the HARQ-ACK according to the first DCI.

In other optional or additional aspects, the receiving at block 1330 may include receiving the HARQ-ACK a number of symbols after transmission of a last symbol of a particular PDCCH transmission of the plurality of PDCCH transmissions, wherein the number of symbols corresponds to the timing offset, and wherein the particular PDCCH transmission is a last PDCCH transmission of the plurality of PDCCH transmissions, the at least one PDCCH transmission, or a specially-configured PDCCH in the time-domain DMRS bundling window.

In other optional or additional aspects, the additional offset has been selected at least according to the processing time capability of the UE and to SCS corresponding to the plurality of PDCCH transmissions.

In other optional or additional aspects, the additional offset corresponds to a default offset value having been selected according to a predetermined rule.

Further, for example, the receiving at block 1330 may be performed to receive, at a timing offset that accounts for processing time of the JCE, the HARQ-ACK in response to the HARQ-ACK request without a corresponding PDSCH grant that is comprised by the at least one PDCCH transmission. Thus, aspects presented herein may potentially improve the accuracy of the channel estimation, and, consequently may enhance PDCCH coverage and/or performance.

In an optional or additional aspect that may be combined with any other aspect, at block 1340 of FIG. 13, the method 1300 may include receiving, from the UE, a report indicating an additional offset capability of the UE, wherein the additional offset capability comprises one or more maximum additional offset values corresponding to one or more SCS configurations. For example, in an aspect, the base station 102, the DMRS bundling component 188, and/or the receiving component 1220 may be configured to or may comprise means for receiving, from the UE 104, a report indicating an additional offset capability of the UE 104, wherein the additional offset capability comprises one or more maximum additional offset values corresponding to one or more SCS configurations.

For example, the receiving at block 1340 may include receiving, from the UE 104, a report indicating a maximum value of the additional offset K supported by the UE 104, as described above in reference to FIGS. 7A-7B.

Further, for example, the receiving at block 1340 may be performed to indicate to the base station 102 the timing offset capabilities of the UE 104.

Implementation examples are described in the following numbered clauses:

1. A method of wireless communication by a UE of a wireless communication network, comprising:
   receiving, from a base station, configuration information indicating that PDCCH JCE is enabled for a plurality of PDCCH monitoring occasions;
   receiving, from the base station, a plurality of PDCCH transmissions, the plurality of PDCCH transmissions being transmitted during the plurality of PDCCH monitoring occasions, wherein at least one PDCCH transmission comprises a HARQ-ACK request without a corresponding PDSCH grant;
   identifying a base offset according to the at least one PDCCH transmission;
   selecting an additional offset according to a processing time capability of the UE; and
   transmitting, at a timing offset in relation to the plurality of PDCCH transmissions, a HARQ-ACK, the timing offset comprising a sum of the base offset and the additional offset.

2. The method of clause 1, wherein receiving the plurality of PDCCH transmissions comprises:
   receiving a plurality of PDCCH transmission repetitions including a respective plurality of DMRS, wherein each PDCCH transmission repetition of the plurality of PDCCH transmission repetitions corresponds to one transmission slot or spans across a plurality of transmission slots; and
   performing channel estimation using the respective plurality of DMRS.

3. The method of clause 1 or 2, wherein receiving the plurality of PDCCH transmissions comprises:
   receiving the plurality of PDCCH transmission repetitions according to a slot aggregation factor.

4. The method of any preceding clause 1 to 3, wherein receiving the plurality of PDCCH transmissions comprises:
   receiving the plurality of PDCCH transmission repetitions within a time-domain DMRS bundling window.

5. The method of any preceding clause 1 to 4, wherein transmitting the HARQ-ACK comprises:
   transmitting the HARQ-ACK a number of symbols after transmission of a last symbol of the at least one PDCCH transmission, wherein the number of symbols corresponds to the timing offset, and wherein the at least one PDCCH transmission is a last PDCCH of a time-domain DMRS bundling window, a first PDCCH of the time-domain DMRS bundling window, or a specifically-configured PDCCH of the time-domain DMRS bundling window.

6. The method of any preceding clause 1 to 5, wherein transmitting the HARQ-ACK comprises:
   transmitting, in response to detection of a DCI indicating a SCell dormancy, the HARQ-ACK after T1 symbols from a last symbol of a first PDCCH providing the DCI;
   transmitting, in response to a SPS PDSCH release, the HARQ-ACK after T2 symbols from a last symbol of a second PDCCH providing the SPS PDSCH release; or
   transmitting, in response to a request for a Type-3 HARQ-ACK codebook, the HARQ-ACK after T3 symbols from a last symbol of a third PDCCH providing the request.

7. The method of any preceding clause 1 to 6, wherein transmitting the HARQ-ACK comprises:
   receiving a first DCI indicating a first resource for a first PUCCH transmission in a slot;
   start monitoring, T4 symbols from a beginning of a first symbol of the first resource for the PUCCH transmission in the slot, for a second DCI indicating a second resource for a second PUCCH transmission in the slot, the second resource being different from the first resource; and
   transmitting, in response to failing to detect the second DCI using the monitoring, the HARQ-ACK according to the first DCI.

8. The method of any preceding clause 1 to 7, wherein receiving the plurality of PDCCH transmissions comprises:
   receiving a plurality of DMRS corresponding to the plurality of PDCCH monitoring occasions within a time-domain DMRS bundling window; and
   jointly performing channel estimation using the plurality of DMRS.

9. The method of any preceding clause 1 to 8, wherein transmitting the HARQ-ACK comprises:
   transmitting the HARQ-ACK a number of symbols after transmission of a last symbol of a particular PDCCH transmission of the plurality of PDCCH transmissions, wherein the number of symbols corresponds to the timing offset, and wherein the particular PDCCH transmission is a last PDCCH transmission of the plurality of PDCCH transmissions, the at least one PDCCH transmission, or a specially-configured PDCCH in the time-domain DMRS bundling window.

10. The method of any preceding clause 1 to 9, wherein the at least one PDCCH transmission comprises at least one of:
    a SPS PDSCH release;
    a Type-3 HARQ-ACK codebook request;
    a SCell dormancy indication; or
    a DCI overriding a current PUCCH resource allocation for transmission of the HARQ-ACK, wherein a time difference between a receive time of the at least one PDCCH transmission comprising the DCI and a scheduled transmission time of the current PUCCH resource allocation exceeds a minimum time offset.

11. The method of any preceding clause 1 to 10, wherein selecting the additional offset comprises:
    selecting the additional offset at least according to the processing time capability of the UE and to SCS corresponding to the plurality of PDCCH transmissions.

12. The method of any preceding clause 1 to 11, wherein selecting the additional offset comprises:
    selecting a default offset value according to a predetermined rule.

13. The method of any preceding clause 1 to 12, further comprising:
  transmitting, to the base station, a report indicating an additional offset capability of the UE, wherein the additional offset capability comprises one or more maximum additional offset values corresponding to one or more SCS configurations.
14. An apparatus of wireless communication by a UE of a wireless communication network, comprising a memory, and a processor communicatively coupled with the memory and configured to perform one or more methods of any preceding clause 1 to 13.
15. An apparatus of wireless communication by a UE of a wireless communication network, comprising means for performing one or more methods of any preceding clause 1 to 13.
16. A computer-readable medium storing instructions of wireless communication by a UE of a wireless communication network, executable by a processor, to perform one or more methods of any preceding clause 1 to 13.
17. A method of wireless communication by a base station of a wireless communication network, comprising:
  transmitting, to a UE, configuration information indicating that PDCCH JCE is enabled for a plurality of PDCCH monitoring occasions;
  transmitting, to the UE, a plurality of PDCCH transmissions, the plurality of PDCCH transmissions being transmitted during the plurality of PDCCH monitoring occasions, wherein at least one PDCCH transmission comprises a HARQ-ACK request without a corresponding PDSCH grant; and
  receiving, at a timing offset in relation to the plurality of PDCCH transmissions, a HARQ-ACK, the timing offset comprising a sum of a base offset and an additional offset, the base offset having been identified according to the at least one PDCCH transmission, and the additional offset having been selected according to a processing time capability of the UE.
18. The method of clause 17, wherein transmitting the plurality of PDCCH transmissions comprises:
  transmitting a plurality of PDCCH transmission repetitions including a respective plurality of DMRS, wherein each PDCCH transmission repetition of the plurality of PDCCH transmission repetitions corresponds to one transmission slot or spans across a plurality of transmission slots, and wherein transmitting the plurality of PDCCH transmission repetitions causes the UE to perform channel estimation using the respective plurality of DMRS.
19. The method of clause 17 or 18, wherein transmitting the plurality of PDCCH transmissions comprises:
  transmitting the plurality of PDCCH transmission repetitions according to a slot aggregation factor.
20. The method of any preceding clause 17 to 19, wherein transmitting the plurality of PDCCH transmissions comprises:
  transmitting the plurality of PDCCH transmission repetitions within a time-domain DMRS bundling window.
21. The method of any preceding clause 17 to 20, wherein receiving the HARQ-ACK comprises:
  receiving the HARQ-ACK a number of symbols after transmission of a last symbol of the at least one PDCCH transmission, wherein the number of symbols corresponds to the timing offset, and wherein the at least one PDCCH transmission is a last PDCCH of a time-domain DMRS bundling window, a first PDCCH of the time-domain DMRS bundling window, or a specifically-configured PDCCH of the time-domain DMRS bundling window.
22. The method of any preceding clause 17 to 21, wherein receiving the HARQ-ACK comprises:
  receiving, in response to transmitting a DCI indicating a SCell dormancy, the HARQ-ACK after T1 symbols from a last symbol of a first PDCCH providing the DCI;
  receiving, in response to transmitting a SPS PDSCH release, the HARQ-ACK after T2 symbols from a last symbol of a second PDCCH providing the SPS PDSCH release; or
  receiving, in response to transmitting a request for a Type-3 HARQ-ACK codebook, the HARQ-ACK after T3 symbols from a last symbol of a third PDCCH providing the request.
23. The method of any preceding clause 17 to 22, wherein receiving the HARQ-ACK comprises:
  transmitting a first DCI indicating a first resource for a first PUCCH transmission in a slot;
  preventing transmitting, less than T4 symbols from a beginning of a first symbol of the first resource for the PUCCH transmission in the slot, a second DCI indicating a second resource for a second PUCCH transmission in the slot, the second resource being different from the first resource; and
  receiving, in response to failing to transmit the second DCI, the HARQ-ACK according to the first DCI.
24. The method of any preceding clause 17 to 23, wherein transmitting the plurality of PDCCH transmissions comprises:
  transmitting a plurality of DMRS corresponding to the plurality of PDCCH monitoring occasions within a time-domain DMRS bundling window, transmitting the plurality of DMRS causing the UE to jointly perform channel estimation using the plurality of DMRS.
25. The method of any preceding clause 17 to 24, wherein receiving the HARQ-ACK comprises:
  receiving the HARQ-ACK a number of symbols after transmission of a last symbol of a particular PDCCH transmission of the plurality of PDCCH transmissions, wherein the number of symbols corresponds to the timing offset, and wherein the particular PDCCH transmission is a last PDCCH transmission of the plurality of PDCCH transmissions, the at least one PDCCH transmission, or a specially-configured PDCCH in the time-domain DMRS bundling window.
26. The method of any preceding clause 17 to 25, wherein the at least one PDCCH transmission comprises at least one of:
  a SPS PDSCH release;
  a Type-3 HARQ-ACK codebook request;
  a SCell dormancy indication; or
  a DCI overriding a current PUCCH resource allocation for transmission of the HARQ-ACK, wherein a time difference between a receive time of the at least one PDCCH transmission comprising the DCI and a scheduled transmission time of the current PUCCH resource allocation exceeds a minimum time offset.
27. The method of any preceding clause 17 to 26, wherein the additional offset has been selected at least according to the processing time capability of the UE and to SCS corresponding to the plurality of PDCCH transmissions.

28. The method of any preceding clause 17 to 27, wherein the additional offset corresponds to a default offset value having been selected according to a predetermined rule.

29. The method of any preceding clause 17 to 28, further comprising:
receiving, from the UE, a report indicating an additional offset capability of the UE, wherein the additional offset capability comprises one or more maximum additional offset values corresponding to one or more SCS configurations.

30. An apparatus of wireless communication by a base station of a wireless communication network, comprising a memory, and a processor communicatively coupled with the memory and configured to perform one or more methods of any preceding clause 17 to 29.

31. An apparatus of wireless communication by a base station of a wireless communication network, comprising means for performing one or more methods of any preceding clause 17 to 29.

32. A computer-readable medium storing instructions of wireless communication by a base station of a wireless communication network, executable by a processor, to perform one or more methods of any preceding clause 17 to 29.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE) of a wireless communication network, comprising:
receiving, from a base station, configuration information indicating that physical downlink control channel (PDCCH) joint channel estimation (JCE) is enabled for a plurality of PDCCH monitoring occasions;
receiving, from the base station, a plurality of PDCCH transmissions, the plurality of PDCCH transmissions being transmitted during the plurality of PDCCH monitoring occasions, wherein at least one PDCCH transmission comprises a hybrid automatic repeat request (HARQ) acknowledgement (ACK) request without a corresponding physical downlink shared channel (PDSCH) grant, without a corresponding allocation of PDSCH resources and without scheduling PDSCH resources;
identifying a base offset from one of the PDCCH transmissions according to the at least one PDCCH transmission and a type of HARQ-ACK request;
selecting an additional offset according to a processing time capability of the UE; and
transmitting, at a timing offset in relation to the plurality of PDCCH transmissions, a HARQ-ACK, the timing offset comprising a sum of the base offset and the additional offset.

2. The method of claim 1, wherein receiving the plurality of PDCCH transmissions comprises:
receiving a plurality of PDCCH transmission repetitions including a respective plurality of demodulation reference signals (DMRS), wherein each PDCCH transmission repetition of the plurality of PDCCH transmission repetitions corresponds to one transmission slot or spans across a plurality of transmission slots; and
performing channel estimation using the respective plurality of DMRS.

3. The method of claim 2, wherein receiving the plurality of PDCCH transmissions comprises:

receiving the plurality of PDCCH transmission repetitions according to a slot aggregation factor.

4. The method of claim 2, wherein receiving the plurality of PDCCH transmissions comprises:
receiving the plurality of PDCCH transmission repetitions within a time-domain DMRS bundling window.

5. The method of claim 2, wherein transmitting the HARQ-ACK comprises:
transmitting the HARQ-ACK a number of symbols after transmission of a last symbol of the at least one PDCCH transmission, wherein the number of symbols corresponds to the timing offset, and wherein the at least one PDCCH transmission is a last PDCCH of a time-domain DMRS bundling window, a first PDCCH of the time-domain DMRS bundling window, or a specifically-configured PDCCH of the time-domain DMRS bundling window.

6. The method of claim 2, wherein transmitting the HARQ-ACK comprises:
transmitting, in response to detection of a downlink control information (DCI) indicating a secondary cell (SCell) dormancy, the HARQ-ACK after T1 symbols from a last symbol of a first PDCCH providing the DCI;
transmitting, in response to a semi-persistent scheduling (SPS) PDSCH release, the HARQ-ACK after T2 symbols from a last symbol of a second PDCCH providing the SPS PDSCH release; or
transmitting, in response to a request for a Type-3 HARQ-ACK codebook, the HARQ-ACK after T3 symbols from a last symbol of a third PDCCH providing the request.

7. The method of claim 2, wherein transmitting the HARQ-ACK comprises:
receiving a first downlink control information (DCI) indicating a first resource for a first physical uplink control channel (PUCCH) transmission in a slot;
start monitoring, T4 symbols from a beginning of a first symbol of the first resource for the PUCCH transmission in the slot, for a second DCI indicating a second resource for a second PUCCH transmission in the slot, the second resource being different from the first resource; and
transmitting, in response to failing to detect the second DCI using the monitoring, the HARQ-ACK according to the first DCI.

8. The method of claim 1, wherein receiving the plurality of PDCCH transmissions comprises:
receiving a plurality of demodulation reference signals (DMRS) corresponding to the plurality of PDCCH monitoring occasions within a time-domain DMRS bundling window; and
jointly performing channel estimation using the plurality of DMRS.

9. The method of claim 8, wherein transmitting the HARQ-ACK comprises:
transmitting the HARQ-ACK a number of symbols after transmission of a last symbol of a particular PDCCH transmission of the plurality of PDCCH transmissions, wherein the number of symbols corresponds to the timing offset, and wherein the particular PDCCH transmission is a last PDCCH transmission of the plurality of PDCCH transmissions, the at least one PDCCH transmission, or a specially-configured PDCCH in the time-domain DMRS bundling window.

10. The method of claim 1, wherein the at least one PDCCH transmission comprises at least one of:
a semi-persistent scheduling (SPS) PDSCH release;
a Type-3 HARQ-ACK codebook request;
a secondary cell (SCell) dormancy indication; or
a downlink control information (DCI) overriding a current physical uplink control channel (PUCCH) resource allocation for transmission of the HARQ-ACK, wherein a time difference between a receive time of the at least one PDCCH transmission comprising the DCI and a scheduled transmission time of the current PUCCH resource allocation exceeds a minimum time offset.

11. The method of claim 1, wherein selecting the additional offset comprises:
selecting the additional offset at least according to the processing time capability of the UE and to sub-carrier spacing (SCS) corresponding to the plurality of PDCCH transmissions.

12. The method of claim 1, wherein selecting the additional offset comprises:
selecting a default offset value according to a predetermined rule.

13. The method of claim 1, further comprising:
transmitting, to the base station, a report indicating an additional offset capability of the UE, wherein the additional offset capability comprises one or more maximum additional offset values corresponding to one or more sub-carrier spacing (SCS) configurations.

14. An apparatus for wireless communication by a user equipment (UE) of a wireless communication network, comprising:
a memory; and
a processor communicatively coupled with the memory and configured to:
receive, from a base station, configuration information indicating that physical downlink control channel (PDCCH) joint channel estimation (JCE) is enabled for a plurality of PDCCH monitoring occasions;
receive, from the base station, a plurality of PDCCH transmissions, the plurality of PDCCH transmissions being transmitted during the plurality of PDCCH monitoring occasions, wherein at least one PDCCH transmission comprises a hybrid automatic repeat request (HARQ) acknowledgement (ACK) request without a corresponding PDCCH grant;
identify a base offset from one of the PDCCH transmissions according to the at least one PDCCH transmission and a type of HARQ-ACK request;
select an additional offset according to a processing time capability of the UE; and
transmit, at a timing offset in relation to the plurality of PDCCH transmissions, a HARQ-ACK, the timing offset comprising a sum of the base offset and the additional offset.

15. The apparatus of claim 14, wherein to select the additional offset comprises to:
select the additional offset at least according to the processing time capability of the UE and to sub-carrier spacing (SCS) corresponding to the plurality of PDCCH transmissions.

16. A method of wireless communication by a base station of a wireless communication network, comprising:
transmitting, to a user equipment (UE), configuration information indicating that physical downlink control channel (PDCCH) joint channel estimation (JCE) is enabled for a plurality of PDCCH monitoring occasions;
transmitting, to the UE, a plurality of PDCCH transmissions, the plurality of PDCCH transmissions being transmitted during the plurality of PDCCH monitoring occasions, wherein at least one PDCCH transmission comprises a hybrid automatic repeat request (HARQ) acknowledgement (ACK) request without a corresponding physical downlink shared channel (PDSCH) grant; and receiving, at a timing offset in relation to the plurality of PDCCH transmissions, a HARQ-ACK, the timing offset comprising a sum of a base offset and an additional offset, the base offset having been identified according to the at least one PDCCH transmission and a type of HARQ-ACK request, and the additional offset having been selected according to a processing time capability of the UE.

17. The method of claim 16, wherein transmitting the plurality of PDCCH transmissions comprises:

transmitting a plurality of PDCCH transmission repetitions including a respective plurality of demodulation reference signals (DMRS), wherein each PDCCH transmission repetition of the plurality of PDCCH transmission repetitions corresponds to one transmission slot or spans across a plurality of transmission slots, and wherein transmitting the plurality of PDCCH transmission repetitions causes the UE to perform channel estimation using the respective plurality of DMRS.

18. The method of claim 17, wherein transmitting the plurality of PDCCH transmissions comprises:

transmitting the plurality of PDCCH transmission repetitions according to a slot aggregation factor.

19. The method of claim 17, wherein transmitting the plurality of PDCCH transmissions comprises:

transmitting the plurality of PDCCH transmission repetitions within a time-domain DMRS bundling window.

20. The method of claim 17, wherein receiving the HARQ-ACK comprises:

receiving the HARQ-ACK a number of symbols after transmission of a last symbol of the at least one PDCCH transmission, wherein the number of symbols corresponds to the timing offset, and wherein the at least one PDCCH transmission is a last PDCCH of a time-domain DMRS bundling window, a first PDCCH of the time-domain DMRS bundling window, or a specifically-configured PDCCH of the time-domain DMRS bundling window.

21. The method of claim 17, wherein receiving the HARQ-ACK comprises:

receiving, in response to transmitting a downlink control information (DCI) indicating a secondary cell (SCell) dormancy, the HARQ-ACK after T1 symbols from a last symbol of a first PDCCH providing the DCI;

receiving, in response to transmitting a semi-persistent scheduling (SPS) PDSCH release, the HARQ-ACK after T2 symbols from a last symbol of a second PDCCH providing the SPS PDSCH release; or receiving, in response to transmitting a request for a Type-3 HARQ-ACK codebook, the HARQ-ACK after T3 symbols from a last symbol of a third PDCCH providing the request.

22. The method of claim 17, wherein receiving the HARQ-ACK comprises:

transmitting a first downlink control information (DCI) indicating a first resource for a first physical uplink control channel (PUCCH) transmission in a slot;

preventing transmitting, less than T4 symbols from a beginning of a first symbol of the first resource for the PUCCH transmission in the slot, a second DCI indicating a second resource for a second PUCCH transmission in the slot, the second resource being different from the first resource; and receiving, in response to failing to transmit the second DCI, the HARQ-ACK according to the first DCI.

23. The method of claim 16, wherein transmitting the plurality of PDCCH transmissions comprises:

transmitting a plurality of demodulation reference signals (DMRS) corresponding to the plurality of PDCCH monitoring occasions within a time-domain DMRS bundling window, transmitting the plurality of DMRS causing the UE to jointly perform channel estimation using the plurality of DMRS.

24. The method of claim 23, wherein receiving the HARQ-ACK comprises:

receiving the HARQ-ACK a number of symbols after transmission of a last symbol of a particular PDCCH transmission of the plurality of PDCCH transmissions, wherein the number of symbols corresponds to the timing offset, and wherein the particular PDCCH transmission is a last PDCCH transmission of the plurality of PDCCH transmissions, the at least one PDCCH transmission, or a specially-configured PDCCH in the time-domain DMRS bundling window.

25. The method of claim 16, wherein the at least one PDCCH transmission comprises at least one of:

a semi-persistent scheduling (SPS) PDSCH release;
a Type-3 HARQ-ACK codebook request;
a secondary cell (SCell) dormancy indication; or
a downlink control information (DCI) overriding a current physical uplink control channel (PUCCH) resource allocation for transmission of the HARQ-ACK, wherein a time difference between a receive time of the at least one PDCCH transmission comprising the DCI and a scheduled transmission time of the current PUCCH resource allocation exceeds a minimum time offset.

26. The method of claim 16, wherein the additional offset has been selected at least according to the processing time capability of the UE and to sub-carrier spacing (SCS) corresponding to the plurality of PDCCH transmissions.

27. The method of claim 16, wherein the additional offset corresponds to a default offset value having been selected according to a predetermined rule.

28. The method of claim 16, further comprising:

receiving, from the UE, a report indicating an additional offset capability of the UE, wherein the additional offset capability comprises one or more maximum additional offset values corresponding to one or more sub-carrier spacing (SCS) configurations.

29. An apparatus for wireless communication by a base station of a wireless communication network, comprising:

a memory; and
a processor communicatively coupled with the memory and configured to:

transmit, to a user equipment (UE), configuration information indicating that physical downlink control channel (PDCCH) joint channel estimation (JCE) is enabled for a plurality of PDCCH monitoring occasions;

transmit, from the base station, a plurality of PDCCH transmissions, the plurality of PDCCH transmissions being transmitted during the plurality of PDCCH monitoring occasions, wherein at least one PDCCH transmission comprises a hybrid automatic repeat request (HARQ) acknowledgement (ACK) request without a corresponding PDCCH grant; and receive, at a timing offset in relation to the plurality of PDCCH transmissions, a HARQ-ACK, the timing offset comprising a sum of a base offset and an additional offset, the base offset having been identified according to the at least one PDCCH transmission and a type of HARQ-ACK request, and the additional offset having been selected according to a processing time capability of the UE.

30. The apparatus of claim 29, wherein the additional offset has been selected at least according to the processing time capability of the UE and to sub-carrier spacing (SCS) corresponding to the plurality of PDCCH transmissions.

* * * * *